US012694557B2

(12) United States Patent
Shimoda

(10) Patent No.: US 12,694,557 B2
(45) Date of Patent: Jul. 28, 2026

(54) HEAD-UP DISPLAY APPARATUS AND METHOD OF PROCESSING VIDEO DATA

(71) Applicant: Maxell, Ltd., Kyoto (JP)

(72) Inventor: Nozomu Shimoda, Kyoto (JP)

(73) Assignee: MAXELL, LTD., Kyoto (JP)

( * ) Notice: Subject to any disclaimer, the term of this patent is extended or adjusted under 35 U.S.C. 154(b) by 0 days.

(21) Appl. No.: 18/876,783

(22) PCT Filed: Mar. 29, 2023

(86) PCT No.: PCT/JP2023/013029
§ 371 (c)(1),
(2) Date: Dec. 19, 2024

(87) PCT Pub. No.: WO2024/042762
PCT Pub. Date: Feb. 29, 2024

(65) Prior Publication Data
US 2025/0378570 A1     Dec. 11, 2025

(30) Foreign Application Priority Data

Aug. 23, 2022     (JP) ................................. 2022-132215
Sep. 29, 2022     (JP) ................................. 2022-156842

(51) Int. Cl.
*B60K 35/23*          (2024.01)
*B60K 35/29*          (2024.01)
(Continued)

(52) U.S. Cl.
CPC ................ *G06T 7/70* (2017.01); *B60K 35/23* (2024.01); *G09G 3/001* (2013.01); *B60K 35/233* (2024.01);
(Continued)

(58) Field of Classification Search
CPC ............. G06T 7/70; G06T 2207/30261; G06T 2200/16; B60K 35/23; B60K 2360/23;
(Continued)

(56) References Cited

U.S. PATENT DOCUMENTS

2012/0320212 A1     12/2012  Aimura et al.
2015/0062169 A1      3/2015  Bono
(Continued)

FOREIGN PATENT DOCUMENTS

JP          2011-22111 A     2/2011
JP          2011-186834 A    9/2011
(Continued)

OTHER PUBLICATIONS

International Search Report of PCT/JP2023/013029 dated May 30, 2023.

*Primary Examiner* — Douglas Wilson
(74) *Attorney, Agent, or Firm* — MATTINGLY & MALUR, PC

(57) ABSTRACT

A head-up display apparatus and a method of processing video data, where the head-up display apparatus includes: a video display configured to display a video and to output video light of the displayed video; a video-light projector configured to project the output video light to a display region, thereby causing the projected video light to be visually recognized as a virtual image; and a controller configured to determine display contents, to prepare video data, and to cause the video display to display a video based on the data. The controller performs control to reduce a processing load required for preparing the video data such that the video data is completely prepared within a predetermined processing cycle. Alternatively, if a preparation time required for preparing the video data of tentatively-determined display contents before determining the display contents is longer than the predetermined processing cycle, (Continued)

| INTERNAL STATES | OPERATIONS | TRANSIT CONDITIONS | DESTINATION OF TRANSIT |
|---|---|---|---|
| NORMAL STATE (ST0) | NORMAL DISPLAY (NOT SUPPRESSED) | PREPARATION TIME (Tp) IS LONGER THAN CONTROL CYCLE (Tc) OR IS LONGER THAN FIRST THRESHOLD TIME (Tth1) IN PLURAL NUMBER OF TIMES IN ROW (e.g. TWICE OR MORE) | ST2 |
| RESTORATION TRANSIT (ST1) | RESTORE STEPWISE DISPLAY CONTENTS OVER RESTORATION TRANSIT PERIOD (e.g. 5 SECONDS) | AFTER RESTORATION TRANSIT PERIOD | ST0 |
| SUPPRESSION TRANSIT STATE (ST2) | SUPPRESS STEPWISE DISPLAY CONTENTS OVER SUPPRESSION TRANSIT PERIOD (e.g. 5 SECONDS) | AFTER SUPPRESSION TRANSIT PERIOD | ST3 |
| SUPPRESSION STATE (ST3) | SUPPRESSED DISPLAY | STATE OF "PREPARATION TIME (Tp) < SECOND THRESHOLD TIME (Tth2)" IS CONTINUED FOR THRESHOLD DURATION (Tth) (e.g. 5 SECONDS) OR LONGER | ST1 | the controller changes the tentatively-determined display contents.

17 Claims, 29 Drawing Sheets

(51) Int. Cl.

| | |
|---|---|
| *G06T 7/70* | (2017.01) |
| *G06V 10/77* | (2022.01) |
| *G09G 3/00* | (2006.01) |
| *B60K 35/233* | (2024.01) |
| *G02B 27/01* | (2006.01) |

(52) U.S. Cl.
CPC ........ *B60K 35/29* (2024.01); *B60K 2360/176* (2024.01); *B60K 2360/23* (2024.01); *B60K 2360/31* (2024.01); *B60K 2360/334* (2024.01); *B60R 2300/205* (2013.01); *B60R 2300/302* (2013.01); *B60R 2300/306* (2013.01); *G02B 27/0101* (2013.01); *G02B 2027/0138* (2013.01); *G02B 2027/014* (2013.01); *G02B 2027/0141* (2013.01); *G06T 2200/16* (2013.01); *G06T 2207/30261* (2013.01); *G06V 10/77* (2022.01); *G09G 2350/00* (2013.01); *G09G 2380/10* (2013.01)

(58) Field of Classification Search
CPC .............. B60K 2360/334; B60K 35/22; B60K 2360/31; B60K 2360/592; B60K 35/233; B60K 35/29; B60K 2360/176; G09G 3/001; G09G 2380/10; G09G 2350/00; G02B 27/0101; G02B 2027/0138; G02B 2027/014; G02B 2027/0141; G06Q 50/10; G06Q 20/3274; B60Y 2300/18108; G06K 19/06028; G06K 19/06037; G06K 19/06112; G06V 10/77; B60R 2300/205; B60R 2300/302; B60R 2300/306
See application file for complete search history.

(56) References Cited

U.S. PATENT DOCUMENTS

| | | | | |
|---|---|---|---|---|
| 2018/0253904 | A1* | 9/2018 | Kuwabara | ............ B60K 35/233 |
| 2019/0084419 | A1* | 3/2019 | Suzuki | .............. G02B 27/0101 |
| 2021/0241425 | A1* | 8/2021 | Uchidate | .................. G06T 5/50 |

FOREIGN PATENT DOCUMENTS

| | | | |
|---|---|---|---|
| JP | 2015-046145 | A | 3/2015 |
| JP | 2015-192430 | A | 11/2015 |
| JP | 2019-6164 | A | 1/2019 |
| WO | 2011/108198 | A1 | 9/2011 |
| WO | 2021/039762 | A1 | 3/2021 |

* cited by examiner

*FIG. 1*

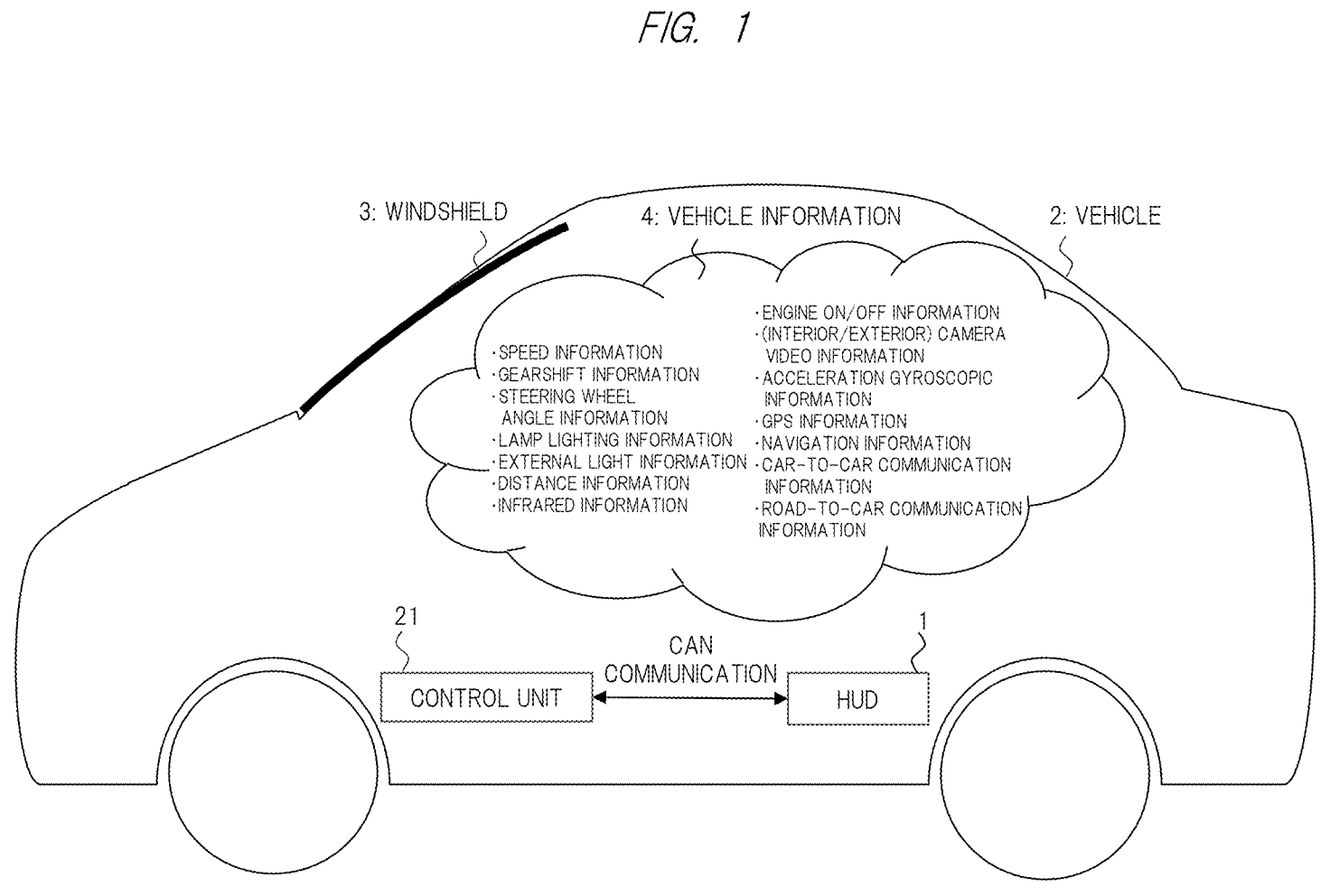

3: WINDSHIELD

4: VEHICLE INFORMATION

2: VEHICLE

- SPEED INFORMATION
- GEARSHIFT INFORMATION
- STEERING WHEEL
  ANGLE INFORMATION
- LAMP LIGHTING INFORMATION
- EXTERNAL LIGHT INFORMATION
- DISTANCE INFORMATION
- INFRARED INFORMATION

- ENGINE ON/OFF INFORMATION
- (INTERIOR/EXTERIOR) CAMERA
  VIDEO INFORMATION
- ACCELERATION GYROSCOPIC
  INFORMATION
- GPS INFORMATION
- NAVIGATION INFORMATION
- CAR-TO-CAR COMMUNICATION
  INFORMATION
- ROAD-TO-CAR COMMUNICATION
  INFORMATION

CONTROL UNIT

21

CAN
COMMUNICATION

HUD

1

1: HUD APPARATUS

1: HUD APPARATUS

Figure 6:
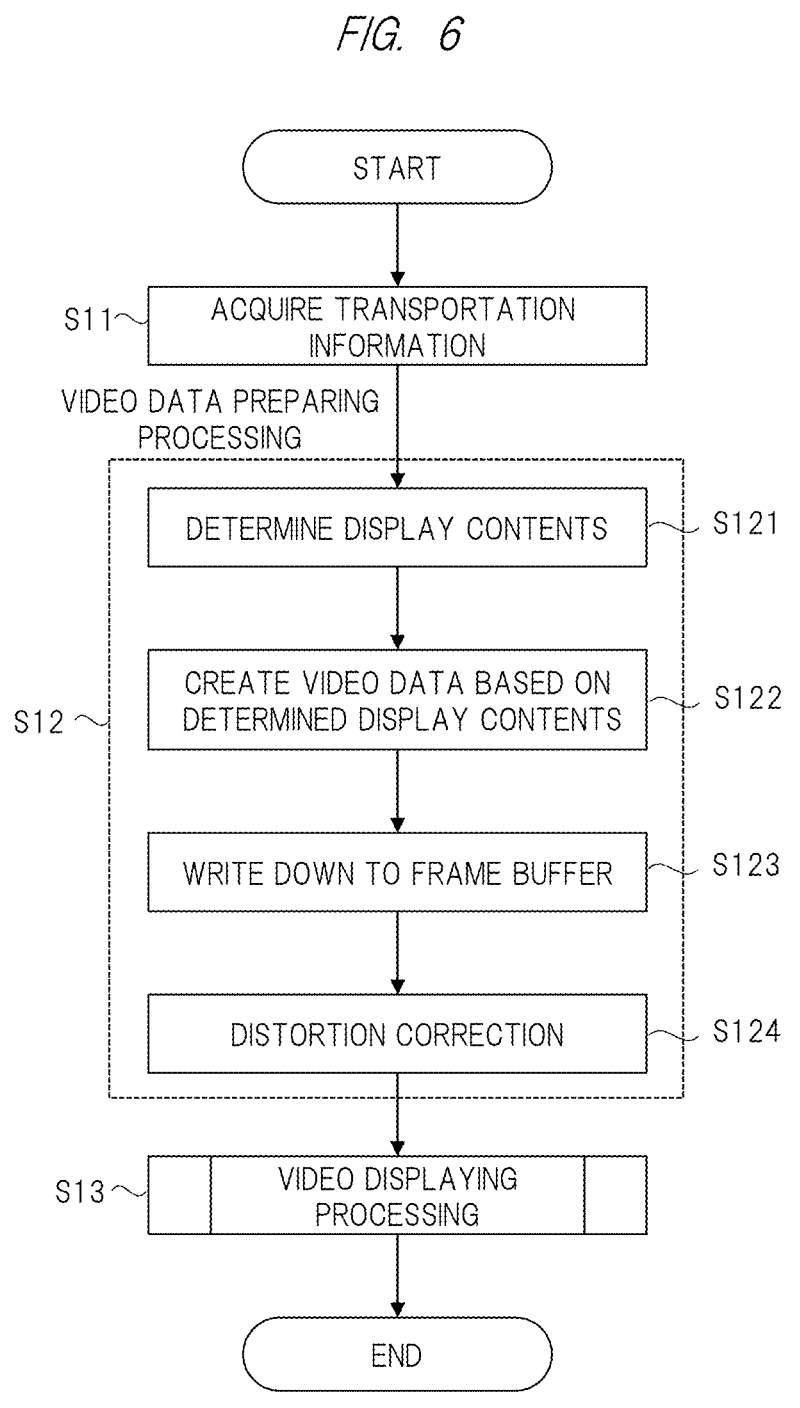

START

S11 — ACQUIRE TRANSPORTATION INFORMATION

VIDEO DATA PREPARING PROCESSING

S12

S121 — DETERMINE DISPLAY CONTENTS

S122 — CREATE VIDEO DATA BASED ON DETERMINED DISPLAY CONTENTS

S123 — WRITE DOWN TO FRAME BUFFER

S124 — DISTORTION CORRECTION

S13 — VIDEO DISPLAYING PROCESSING

END

*FIG. 9*

| INTERNAL STATES | OPERATIONS | TRANSIT CONDITIONS | DESTINATION OF TRANSIT |
|---|---|---|---|
| NORMAL STATE (ST0) | NORMAL DISPLAY (NOT SUPPRESSED) | PREPARATION TIME (Tp) IS LONGER THAN CONTROL CYCLE (Tc) OR IS LONGER THAN FIRST THRESHOLD TIME (Tth1) IN PLURAL NUMBER OF TIMES IN ROW (e.g. TWICE OR MORE) | ST2 |
| RESTORATION TRANSIT (ST1) | RESTORE STEPWISE DISPLAY CONTENTS OVER RESTORATION TRANSIT PERIOD (e.g. 5 SECONDS) | AFTER RESTORATION TRANSIT PERIOD | ST0 |
| SUPPRESSION TRANSIT STATE (ST2) | SUPPRESS STEPWISE DISPLAY CONTENTS OVER SUPPRESSION TRANSIT PERIOD (e.g. 5 SECONDS) | AFTER SUPPRESSION TRANSIT PERIOD | ST3 |
| SUPPRESSION STATE (ST3) | SUPPRESSED DISPLAY | STATE OF "PREPARATION TIME (Tp) < SECOND THRESHOLD TIME (Tth2)" IS CONTINUED FOR THRESHOLD DURATION (TthD) (e.g. 5 SECONDS) OR LONGER | ST1 |

*FIG. 14*

| ITEMS AFFECTING PREPARATION TIME | | AFFECTED CONTENTS |
|---|---|---|
| NUMBER OF VIDEOS | | THE LARGER THE NUMBER IS, THE LONGER THE PREPARATION TIME IS (THE LARGER THE PROCESSING LOAD IS). |
| DISPLAY FORMAT OF EACH VIDEO | | THE SMALLER THE NUMBER IS, THE SHORTER THE PREPARATION TIME IS (THE SMALLER THE PROCESSING LOAD IS). |
| | SIZE | THE LARGER THE SIZE IS, THE LONGER THE PREPARATION TIME IS (THE LARGER THE PROCESSING LOAD IS). |
| | | THE SMALLER THE SIZE IS, THE SHORTER THE PREPARATION TIME IS (THE SMALLER THE PROCESSING LOAD IS). |
| | DISPLAY POSITION | FOR SENSE OF PERSPECTIVE, THE NEARER(TO FOREGROUND) THE DISPLAY POSITION IS, THE LARGER THE SIZE IS, OR THE NEARER TO BACKGROUND (THE FARTHER) THE DISPLAY POSITION IS, THE SMALLER THE SIZE IS.→SIMILAR RESULTS AS IN "SIZE" |
| | DESIGN TYPE | THE MORE COMPLICATED THE DESIGN IS (e.g. CASE OF NOT 2D BUT 3D, CASE OF 3D WITH LARGE POLYGON COUNTS, WITH GRADATION), THE LONGER THE PREPARATION TIME IS (THE LARGER THE PROCESSING LOAD IS). |
| | | THE SIMPLER THE DESIGN IS (e.g. CASE OF NOT 3D BUT 2D, CASE OF 3D WITH SMALL POLYGON COUNTS, WITHOUT GRADATION), THE SHORTER THE PREPARATION TIME IS (THE SMALLER THE PROCESSING LOAD IS). |
| DISTORTION CORRECTION | | PREPARATION TIME IS SHORTER IN CORRECTION PROCESSING ON HARDWARE |
| | | PREPARATION TIME IS LONGER IN CORRECTION PROCESSING ON SOFTWARE |

*FIG. 17A*

400: PREDICTED TIME INFORMATION

| VIDEO | BASIC TIME = 0.8[msec] | | | | PREDICTED TIME FOR EACH VIDEO (Tr)[msec] |
| | SIZE COEFFICIENT (C1) | DISPLAY POSITION COEFFICIENT (C2) | DESIGN TYPE COEFFICIENT (C3) | | |
| | | | POLYGON COUNT COEFFICIENT (C31) | GRADATION COEFFICIENT (C32) | |
| VD1 | 5 | NEAR(×1.5) | MANY(×1.2) | WITH(×1.1) | 0.8×5×1.5×1.2×1.1=7.9 |
| VD2 | 2 | MIDDLE(×1.0) | STANDARD(×1.0) | WITHOUT(×1.0) | 0.8×2×1.0×1.0×1.0=1.6 |
| VD3 | 10 | FAR(×0.5) | STANDARD(×1.0) | WITH(×1.1) | 0.8×10×0.5×1.0×1.1=4.4 |
| TOTAL PREDICTED TIME (PREDICTED PREPARATION TIME (Tp))[msec] | | | | | 7.9+1.6+4.4=13.9 |

FIG. 17B

400: PREDICTED TIME INFORMATION

| VIDEO | SIZE COEFFICIENT (C1) | DISPLAY POSITION COEFFICIENT (C2) | DESIGN TYPE COEFFICIENT (C3) | | BASIC TIME = 0.8[msec] PREDICTED TIME FOR EACH VIDEO (Tr)[msec] |
| | | | POLYGON COUNT COEFFICIENT (C31) | GRADATION COEFFICIENT (C32) | |
|---|---|---|---|---|---|
| VD1 | 5 | NEAR(×1.5) | MANY(×1.2) | WITH(×1.1) | 0.8×5×1.5×1.2×1.1=7.9 |
| VD2 | 2 | MIDDLE(×1.0) | STANDARD (×1.0) | WITHOUT(×1.0) | 0.8×2×1.0×1.0×1.0=1.6 |
| VD3 | 10 | FAR(×0.5) | STANDARD (×1.0) | WITH(×1.1) | 0.8×10×0.5×1.0×1.1=4.4 |
| VD4 | 8 | MIDDLE(×1.0) | STANDARD (×1.0) | WITHOUT(×1.0) | 0.8×8×1.0×1.0×1.0 = 6.4 |
| VD5 | 2 | NEAR(×1.5) | MANY(×1.2) | WITHOUT(×1.0) | 0.8×2×1.5×1.2×1.0 = 2.9 |
| TOTAL PREDICTED TIME (PREDICTED PREPARATION TIME (Tp))[msec] | | | | | 7.9+1.6+4.4+6.4+2.9=23.2 |

FIG. 18

410: PRIORITY INFORMATION

| PRIORITY | ITEMS TO BE CHANGED | | SPECIFIC EXAMPLES OF CONTENTS TO BE CHANGED |
|---|---|---|---|
| 1 | | DESIGN TYPE | CHANGE 3D TO 2D, DISABLE GRADATION |
| 2 | DISPLAY FORMAT OF EACH VIDEO | SIZE | REDUCE SIZE |
| 3 | | DISPLAY POSITION | MOVE DISPLAY POSITION TOWARD BACKGROUND |
| 4 | | DISTORTION CORRECTION (FOR SOFTWARE) | SIMPLIFY OR ELIMINATE DISTORTION CORRECTION |
| 5 | NUMBER OF VIDEOS | | REDUCE VIDEOS |

HIGH ←——————→ LOW

CHANGE IN DISPLAY CONTENTS

OB3

VDa3a(e.g. GREEN)

415: DISPLAY SETTING TABLE

| DISTANCE | COLOR OF ALERT VIDEO |
|---|---|
| SMALLER THAN 12 m | RED |
| 12m~17m | RED + YELLOW GRADATION |
| 17m~27m | YELLOW |
| 27m~32m | YELLOW + GREEN GRADATION |
| LARGER THAN 32 m | GREEN |

HEAD-UP DISPLAY APPARATUS AND METHOD OF PROCESSING VIDEO DATA

TECHNICAL FIELD

The present invention relates to a head-up display apparatus and a method of processing video data, and relates to, for example, a technique for a head-up display apparatus using augmented reality (AR).

BACKGROUND ART

A Patent Document 1 discloses a display system of extracting an object to be an AR display target on the basis of captured-image data, generating AR image data of the object, and setting a frame rate of the AR image data on the basis of the importance of the object. For example, assuming that three items of the AR image data are displayed in a time division manner at a total frame rate of 60 fps, the frame rates of the three items of the AR image data are set at 30 fps, 20 fps, and 10 fps depending on the importance. Thereby, the higher the importance of the AR image data is, the more the suppression of flickering is.

RELATED ART DOCUMENT

Patent Document

Japanese Patent Application Laid-open Publication No. 2019-6164

SUMMARY OF THE INVENTION

Problems to be Solved by the Invention

In a head-up display apparatus, various items of video data are prepared on the basis of information acquired from advanced driver assistance systems (ADAS) and the like, and video light based on the video data is visually recognized as a virtual image when being projected to a display region. At this time, a preparation time required for preparing the video data changes depending on the type of the video, the number of videos, the size of the video depending on the sense of perspective of the distance to the virtual image, a display format such as 2D/3D, the presence/absence of graphics effect, and the like. Note that the head-up display apparatus will be also referred to as a HUD apparatus in the present specification.

Here, in the HUD apparatus, generally, the processing performance of the highest frame rate or the like is fixedly defined mainly based on a hardware specification. To the contrary, there may be the need to, for example, change the display specification of the HUD apparatus through update of the software without change of the hardware itself of the HUD apparatus. At this time, a required display specification of the HUD apparatus often increases a processing load. Consequently, the hardware processing performance is inadequate, and the required display specification cannot be met due to, for example, drop frame in AR display or the like.

The present invention has been made in consideration of such problems, and its one objective is to provide a head-up display apparatus and a method of processing video data, capable of meeting the required display specification as much as possible within the scope of hardware processing performance and flexibly supporting various display specifications.

The above and other objectives and novel characteristics of the present invention will be become apparent from the description of the present specification and the drawings.

Means for Solving the Problems

The outline of the typical aspects of the inventions disclosed in the present application will be briefly described as follows.

A typical head-up display apparatus includes: a video display configured to display a video and output video light of the displayed video; a video-light projector configured to project the output video light to a display region to cause the projected video light to be visually recognized as a virtual image; and a controller configured to determine display contents based on acquired information on a transportation, prepare video data based on the determined display contents, and cause the video display to display a video based on the prepared video data. The controller performs control to reduce a processing load required for preparing the video data such that the video data is completely prepared within a predetermined processing cycle. Alternatively, if a preparation time required for preparing the video data with display contents tentatively determined before determining the display contents is longer than the predetermined processing cycle, the controller changes the tentatively-determined display contents.

Effects of the Invention

According to the brief description of the effects obtained by the typical aspects of the present invention disclosed in the present application, the head-up display apparatus can flexibly support various display specifications.

BRIEF DESCRIPTIONS OF THE DRAWINGS

FIG. 1 is a schematic diagram illustrating an exemplary configuration of a vehicle mounting a head-up display apparatus according to a first embodiment.

FIG. 3A is a block diagram illustrating an exemplary configuration of principal components of a control system in charge of control in the HUD apparatus of FIGS. 2A and 2B.

FIG. 6 is a flowchart illustrating an exemplary processing procedure of displaying a video in the HUD apparatus of FIG. 3A

FIG. 9 is a diagram illustrating an exemplary internal state of a controller of FIG. 3A.

FIG. 14 is a diagram illustrating an exemplary item affecting a video-data preparation time in FIG. 6.

FIG. 17A is a diagram illustrating a specific example of a method of predicting a preparation time (step S412) of FIG. 16.

FIG. 17B is a diagram illustrating a specific example different from that of FIG. 17A.

FIG. 18 is a diagram for explaining an exemplary method of changing a display content (step S414) of FIG. 16.

FIG. 23 is a diagram illustrating an exemplary configuration of a display setting table stored in the controller of the HUD apparatus according to the third embodiment.

DETAILED DESCRIPTION OF PREFERRED EMBODIMENTS

Figure 2A:
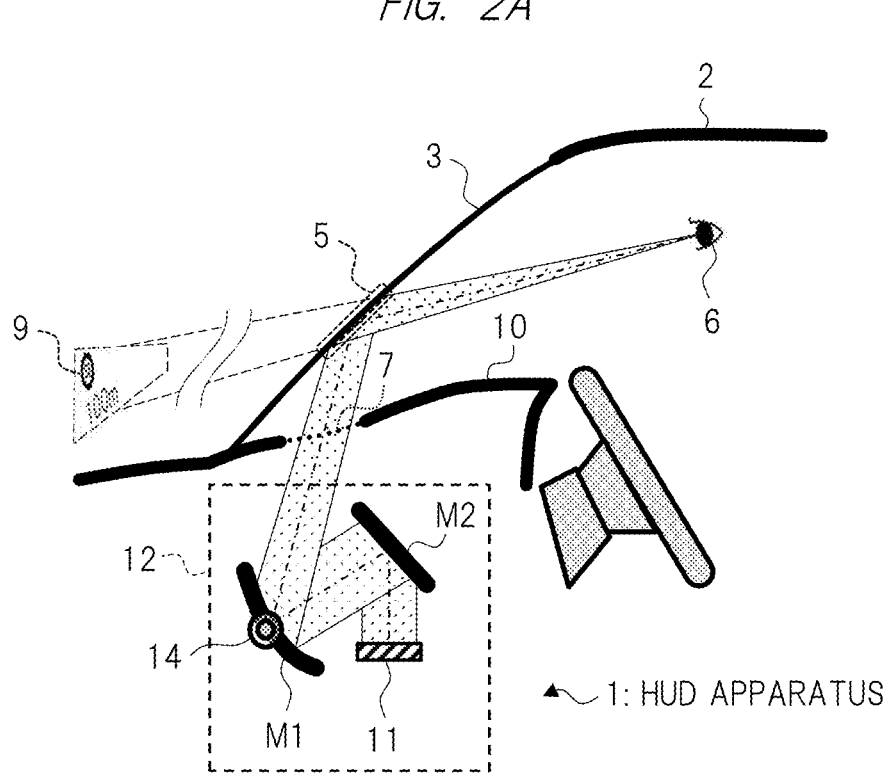
FIG. 2A is a schematic diagram illustrating an exemplary configuration of principal components in the HUD apparatus of FIG. 1.

Hereinafter, embodiments of the present invention will be described in detail with reference to the accompanying drawings. Note that the same components are denoted with the same reference symbols throughout all the drawings for describing the embodiments, and the repetitive description thereof will be omitted.

First Embodiment

<Outline of HUD Apparatus>

FIG. 1 is a schematic diagram illustrating an exemplary configuration of a vehicle mounting a head-up display apparatus according to a first embodiment. A head-up display (HUD) apparatus 1 of FIG. 1 is mounted on a vehicle 2 as a type of transportation. The vehicle 2 is typically an automobile (car), but the vehicle 2 is not necessarily limited thereto, and may be a railroad vehicle or the like. Further, the transportation is not limited to such a vehicle, and may be an airplane or the like. Furthermore, for example, a control unit 21 called electronic control unit (ECU) is mounted on the vehicle 2.

The control unit 21 acquires vehicle information 4 from, for example, various sensors installed in the respective portions of the vehicle 2, a navigation apparatus, and the like. The sensors sense, for example, various events occurring in the vehicle 2 and sense various parameter values for traveling situations. The HUD apparatus 1 acquires the vehicle information 4 acquired by the control unit 21 by using, for example, controller area network (CAN) communication or the like.

The vehicle information 4 includes, for example, speed information of the vehicle 2, gearshift information thereof, steering-wheel angle information thereof, lamp lighting information thereof, external-light information thereof, distance information thereof, infrared information thereof, engine ON/OFF information thereof, video information of exterior and interior cameras thereof, acceleration gyroscopic information thereof, global positioning system (GPS) information thereof, navigation information thereof, car-to-car communication information thereof, road-to-car communication information thereof, and the like. The GPS information includes current time information and the like. The vehicle information 4 further includes various types of alert information. The HUD apparatus 1 projects video light to a display region such as a windshield 3 on the basis of the vehicle information 4. Thereby, in the HUD apparatus 1, for a user who is a driver or the like, the video light projected on the display region is visually recognized as a virtual image, more specifically as a virtual image superimposed on scenery ahead of the vehicle 2.

FIG. 2A is a schematic diagram illustrating an exemplary configuration of principal components of the HUD apparatus of FIG. 1. The HUD apparatus 1 of FIG. 2A includes, for example, a video display 11, mirrors M1 and M2, a mirror driver 14, and the like which are housed in a housing 12. The video display 11 is, for example, a display panel such as liquid crystal display (LCD), a projector, or the like, and displays a video on the basis of the input video data, and outputs video light of the displayed video.

The mirror M2 reflects the video light from the video display 11 toward the mirror M1. The mirror M2 has an effect of securing a long optical path in a small space. The mirror M2 may not be arranged or a plurality of mirrors M2 may be arranged depending on the space in the HUD housing and a required optical path length. The mirror M1 functions as a video-light projector. The mirror M1 as the video-light projector projects the video light, which is output from the video display 11 and is reflected by the mirror M2, to a display region 5 of the windshield 3 via an opening 7 provided on a dashboard 10. Thereby, the video-light projector causes a user 6 to visually recognize the projected video light as the virtual image.

Specifically, the mirror M1 is, for example, a concave mirror (magnifying lens) to reflect and enlarge the video light reflected by the mirror M2, and projects it to the display region 5 via the opening 7. The video light projected to the display region 5 is reflected on the display region 5, and enters the eyes of the user 6. Consequently, the user 6 visually recognizes the video light projected to the display region 5 as a virtual image 9 beyond the transparent windshield 3, such that the virtual image is superimposed on scenery (such as road, building, and person) outside the vehicle. Information expressed by the virtual image 9 includes various items of information such as a road sign, a current speed of an own vehicle, and various items of additional information of objects in the scenery and AR information.

Further, each of the mirrors M1 and M2 may be, for example, a free curved surface mirror, a mirror with an asymmetric optical axis shape, or the like. Here, the mirror M2 has a fixed installation angle. To the contrary, a mirror driver 14 is installed in the mirror M1. The mirror driver 14 variably adjusts the installation angle of the mirror M1. Specifically, the mirror driver 14 includes, for example, a motor, and rotates the mirror M1 in response to rotation of the motor.

The installation angle of the mirror M1 is variably adjusted, thereby adjusting the position of the display region 5 on the windshield 3, in other words, adjusting the position of the virtual image to be visually recognized by the user 6 in an up-down direction. Further, the installation angle of the mirror M1 is variably adjusted, thereby protecting the video display 11 from the sunlight. Specifically, the sunlight may reversely travel in the optical path of the video light, and enter the video display 11. If the video display 11 is highly possibly damaged by the incident sunlight, it is only need to change the installation angle of the mirror M1 such that the sunlight does not reach the video display 11.

Figure 2B:
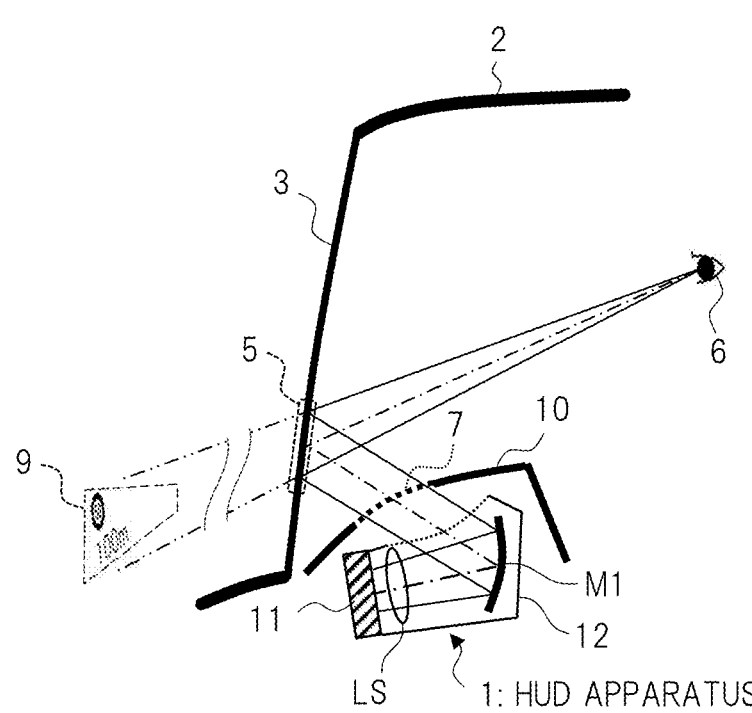
FIG. 2B is a schematic diagram illustrating an exemplary configuration of principal components in the HUD apparatus of FIG. 1, different from that of FIG. 2A.

FIG. 2B is a schematic diagram illustrating an exemplary configuration of principal components in the HUD apparatus of FIG. 1, different from FIG. 2A. The HUD apparatus 1 of FIG. 2B is different from that of FIG. 2A in that a lend LS is provided instead of the mirror M2 in the housing 12. The video light from the video display 11 enters the mirror M1 via the lens LS. As similar to FIG. 2A, the mirror M1 projects the incident video light to the display region 5 via the opening 7. As similar to FIG. 2A, the mirror M1 may be provided with a mirror driver. The configuration of FIG. 2B may be applied when the windshield 3 is installed at nearly right angle as seen in, for example, a van, a truck, or the like.

Figure 3A:
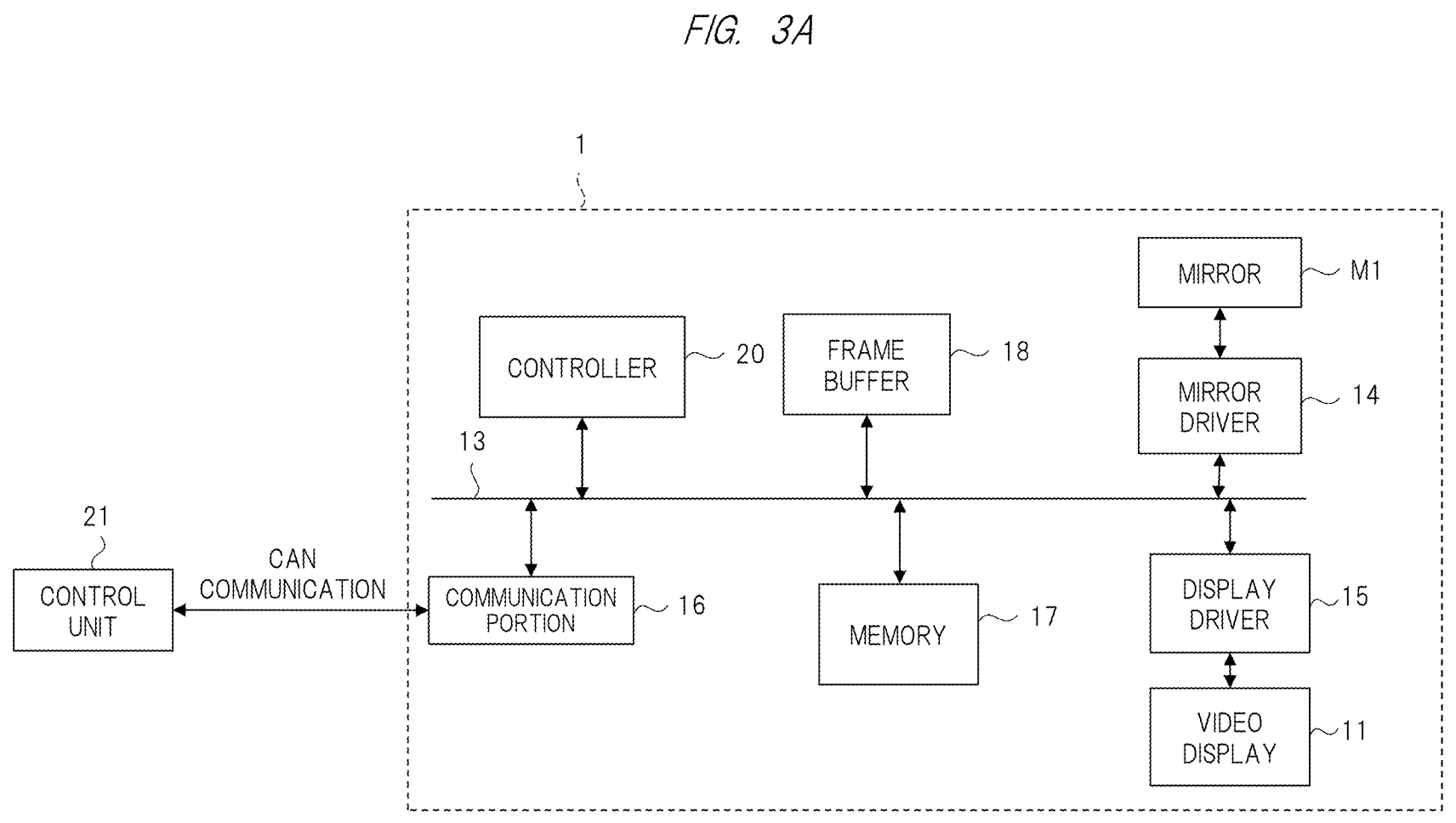

FIG. 3A is a block diagram illustrating an exemplary configuration of principal components of a control system in charge of control in the HUD apparatus illustrated in FIGS. 2A and 2B. The HUD apparatus 1 of FIG. 3A includes the mirror driver 14, a display driver 15, a communication portion 16, a memory 17, a frame buffer 18, and a controller 20 which are mutually connected via a bus 13.

The communication portion 16 receives and transmits the vehicle information, is achieved by, for example, a communication interface circuit or the like, and functions as an information acquiring portion. The communication portion 16 acquires or receives transportation information from the control unit 21 by using the CAN communication or the like, and transmits the received transportation information to the controller 20. The controller 20 controls the mirror driver 14 and the display driver 15 on the basis of the information from the communication portion 16. As illustrated in FIG.

2A, the mirror driver 14 adjusts, for example, the installation angle of the mirror M1 in response to an instruction from the controller 20. The mirror driver 14 can be achieved by the motor as illustrated in FIG. 2A and a motor driver circuit for driving the motor or the like.

The frame buffer 18 is made of, for example, a volatile memory, and stores video data. The display driver 15 reads out the video data stored in the frame buffer 18 via the bus 13, and drives the video display 11 on the basis of the video data. The video display 11 is a liquid crystal display or the like including, for example, a light source and a display panel. The display panel displays a video thereon by, for each pixel, modulating backlight irradiated from the light source on the basis of the video data. In this case, the display driver 15 is achieved by an LCD driver circuit or the like.

The memory 17 is made of a combination of, for example, a volatile memory and a non-volatile memory, and stores a program, data, and the like used in the controller 20. The controller 20 is achieved by, for example, a processor such as central processing unit (CPU) or graphics processing unit (GPU), and controls the entire HUD apparatus 1 by executing the program stored in the memory 17. In exemplary control, the controller 20 prepares the video data to create the video data on the basis of the transportation information acquired by the communication portion 16 that is the information acquiring portion, and causes the video display 11 to display a video based on the prepared video data.

Note that the communication portion 16, the memory 17, the frame buffer 18, and the controller 20 illustrated in FIG. 3A may be mounted on a microcontroller or the like. However, the present invention is not limited thereto, and an aspect of a combination of a field programmable gate array (FPGA), an application specific integrated circuit (ASIC), or the like may be applied as needed.

Figure 3B:
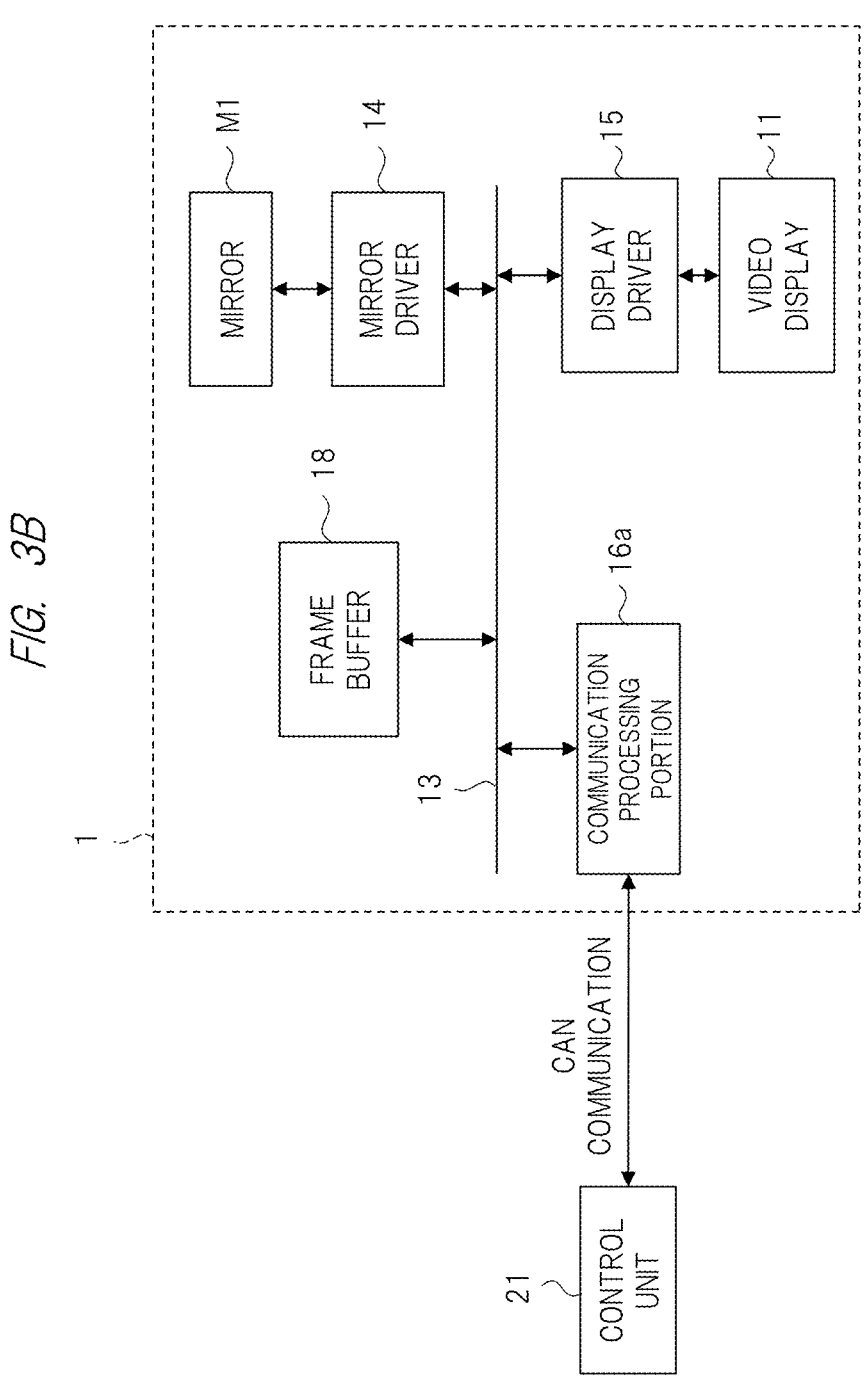
FIG. 3B is a block diagram illustrating an exemplary configuration of principal components of the control system in charge of control in the HUD apparatus of FIGS. 2A and 2B, different from that of FIG. 3A.

FIG. 3B is a block diagram illustrating an exemplary configuration of principal components of the control system in charge of control in the HUD apparatus illustrated in FIGS. 2A and 2B, different from FIG. 3A. The HUD apparatus 1 of FIG. 3B is different from that of FIG. 3A in that the memory 17 and the controller 20 are not provided. In this case, the control unit 21 creates the video data instead of the controller 20 of FIG. 3A, and writes down the created video data to the frame buffer 18 via a communication processing portion 16a.

In the exemplary configuration of FIG. 3B, note that the controller 20 of FIG. 3A may function in the communication processing portion 16a. Alternatively, the controller 20 may be partially function in the control unit 21 and the communication processing portion 16a. The exemplary configuration of FIG. 3B includes the mirror driver 14, the display driver 15, and the communication processing portion 16a. As different from the communication portion 16 of FIG. 3A, the communication processing portion 16a receives the transportation information from the control unit 21 via the CAN communication or the like, processes the received information, and adjusts the operations of the mirror driver 14 and the display driver 15 on the basis of the processing result.

Figure 4:
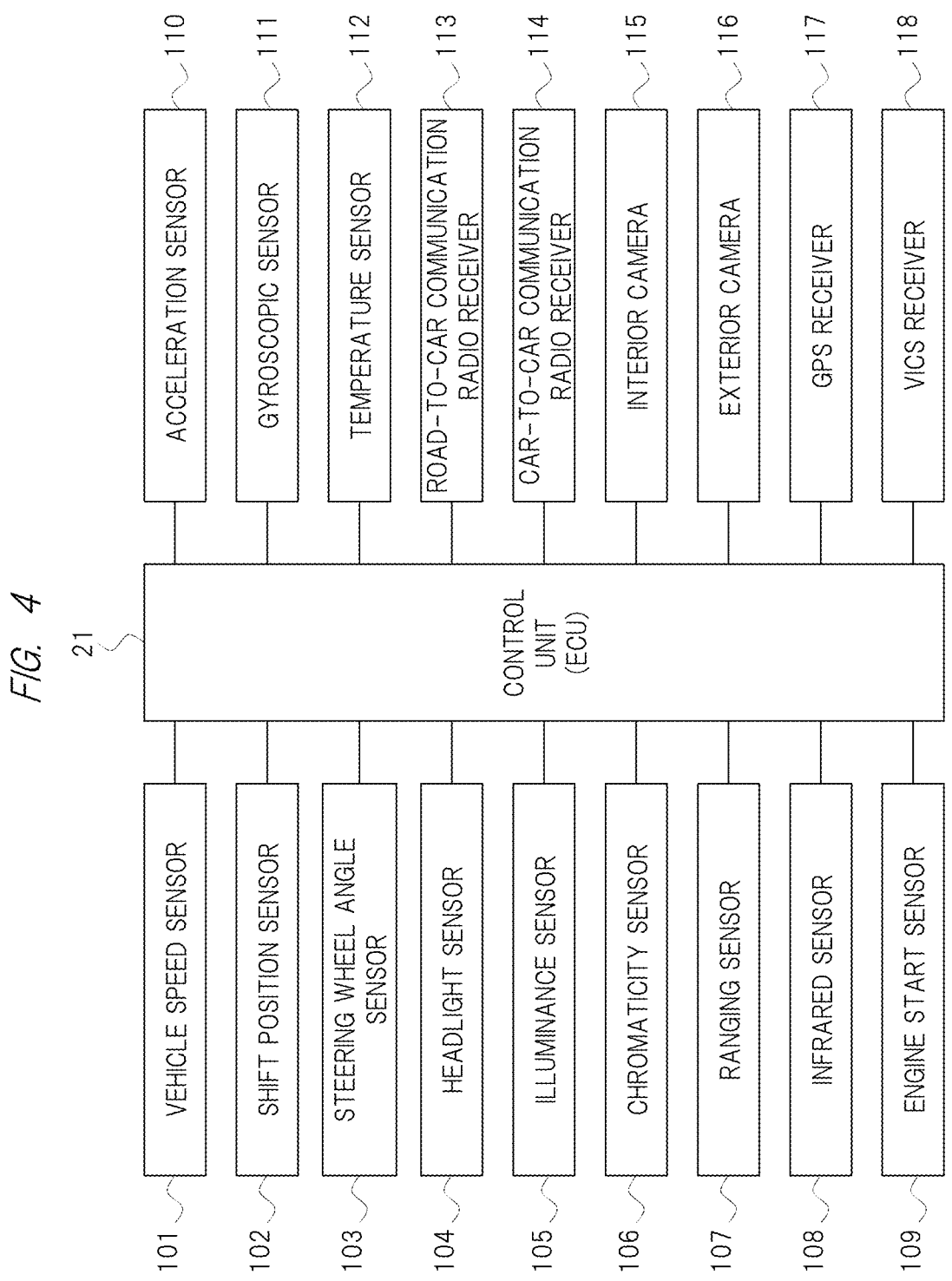
FIG. 4 is a block diagram illustrating an exemplary configuration of components for a control unit in FIGS. 3A and 3B.

FIG. 4 is a block diagram illustrating an exemplary configuration of components for the control unit in FIGS. 3A and 3B. The control unit 21 acquires the vehicle information 4 as illustrated in FIG. 1. The vehicle information 4 is generated by the information acquiring device such as various sensors connected to the control unit 21 as illustrated in FIG. 4. FIG. 4 illustrates an example of the information acquiring device.

In FIG. 4, for example, a vehicle speed sensor 101 senses a speed of the vehicle 2 of FIG. 1, and generates speed information as a sensing result. A shift position sensor 102 senses a current gearshift, and generates gearshift information as a sensing result. A steering-wheel angle sensor 103 senses a current steering-wheel angle, and generates steering-wheel-angle information as a sensing result. A headlight sensor 104 senses ON/OFF of the headlight, and generates lamp lighting information as a sensing result. An illuminance sensor 105 and a chromaticity sensor 106 sense an external light, and generate external-light information as a sensing result.

A ranging sensor 107 senses a distance between the vehicle 2 and an external object, and generates distance information as a sensing result. An infrared sensor 108 senses presence/absence of an object near the vehicle 2, the distance between the vehicle 2 and the object, or the like, and generates infrared information as a sensing result. An engine start sensor 109 senses ON/OFF of the engine, and generates ON/OFF information as a sensing result. An acceleration sensor 110 and a gyroscopic sensor 111 sense an acceleration and an angular rate of the vehicle 2, respectively, and generate acceleration gyroscopic information indicating a posture or behavior of the vehicle 2 as a sensing result. A temperature sensor 112 senses temperatures outside and inside the vehicle, and generates temperature information as a sensing result.

A road-to-car communication wireless receiver 113 generates road-to-car communication information via road-to-car communication between the vehicle 2 and a road, a road sign, a traffic light, or the like. A car-to-car communication wireless receiver 114 generates car-to-car communication information via car-to-car communication between the vehicle 2 and a different vehicle around the vehicle 2. An interior camera 115 and an exterior camera 116 generate interior camera video information and exterior camera video information by capturing inside and outside images of the vehicle, respectively. The interior camera 115 is a camera for, for example, a driver monitoring system (DMS) of capturing an image of a posture of the user 6, positions and motions of his/her eyes, and the like illustrated in FIG. 2A and others. In this case, the captured video is analyzed, thereby recognizing a tiredness level, a line-of-sight position, and the like of the user 6.

To the contrary, the exterior camera 116 captures an image of, for example, a surrounding state such as a state ahead of or behind the vehicle 2. In this case, the captured video is analyzed, thereby recognizing presence/absence of an obstacle such as a different vehicle or a person in the surroundings, building, landscape, a road condition based on rain, snow, freezing, surface asperities or the like, road sign, and the like. Additionally, the exterior camera 116 may include, for example, a dashboard camera for recording videos of traveling situations or the like.

A GPS receiver 117 generates GPS information acquired by receiving a GPS signal. For example, the current time can be acquired by the GPS receiver 117. A vehicle information and communication system (VICS) (registered trademark) receiver 118 generates VICS information acquired by receiving a VICS signal. The GPS receiver 117 or the VICS receiver 118 may be provided as part of the navigation apparatus. For the information acquiring devices of FIG. 4, note that the information acquiring devices may be deleted, other type of device may be added thereto, or the information acquiring devices may be replaced with other type of device as needed.

<Display of HUD Apparatus>

Figure 5:
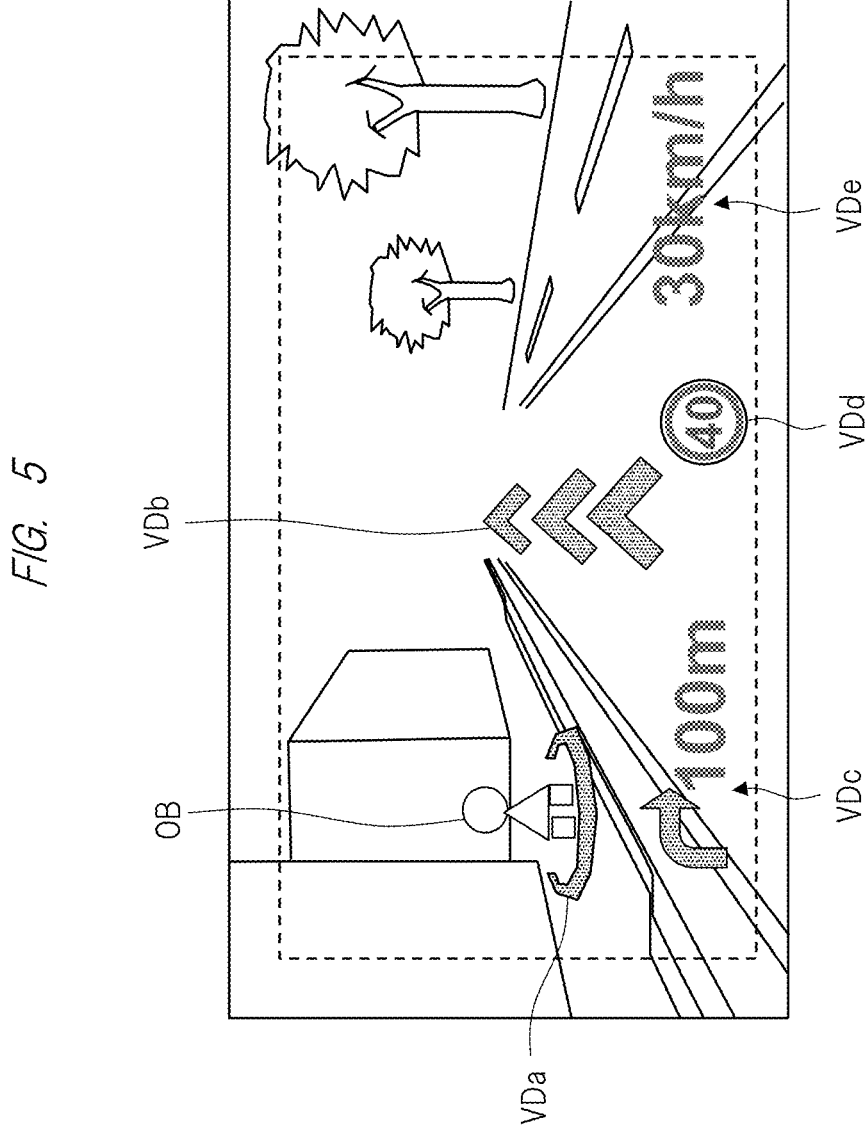
FIG. 5 is a schematic diagram illustrating exemplary display contents of the HUD apparatus of FIG. 1.

FIG. 5 is a schematic diagram illustrating exemplary display contents of the HUD apparatus of FIG. 1. The display contents are illustrated as exemplary AR display, and are illustrated as an exemplary virtual image 9 of FIG. 2A or others. In the example of FIG. 5, five videos VDa to VDe are displayed. In the present specification, the videos VDa to VDe are collectively referred to as videos VD, images VD, or video objects VD.

The video VDa is part of scenery, and is displayed to be superimposed on an object OB such as a person in this case, that is an AR target. The video VDa means that the object OB has been sensed by the information acquiring devices of FIG. 4. That is, from the control unit 21, the HUD apparatus 1 acquires the information on the sensing results of the object OB. Further, the video VDa indicates alert information for encouraging the user 6 such as a driver to seek attention to the object OB.

The video VDb is displayed on a road as part of scenery, and indicates the travelling direction of the vehicle 2. The video VDc indicates navigation information. The video VDd indicates, for example, the road sign as one item of the road-to-car communication information. The video VDe indicates the speed information of the vehicle 2. Note that the videos VDa and VDb are of 3D graphics, and the videos VDc to VDe are of 2D graphics.

FIG. 6 is a flowchart illustrating an exemplary processing procedure in displaying the video in the HUD apparatus of FIG. 3A. In FIG. 6, first, the communication portion 16 as the information acquiring portion acquires the transportation information from the control unit 21 (step S11). Subsequently, the controller 20 performs a video data preparing processing including steps S121 to S124 (step S12). For example, the processor executes the processings of steps S121 to S123 by executing a video processing program stored in the memory 17.

In step S121, the controller 20 determines the display contents on the basis of the transportation information such as the vehicle information 4 of FIG. 1 acquired in step S11. Specifically, the controller 20 selects the vehicle information 4 corresponding to the display, and determines at which position and with which size and which layout the videos VD indicating the selected vehicle information 4 are to be displayed. In the example of FIG. 5, the controller 20 determines that the five videos VDa to VDe are to be displayed as the display contents. In step S122, the controller 20 creates the video data for each video VD on the basis of the display contents determined in step S121.

In step S123, the controller 20 writes down a plurality of items of video data created in step S122 to the storage regions corresponding to the display positions in the frame buffer 18, respectively. In step S124, the controller 20 makes distortion correction of the total video data in the frame buffer 18 in accordance with, for example, the curvature of the windshield 3 or the like. Note that the distortion correction may be made by, for example, the processor executing a distortion correction program stored in the memory 17 or by dedicated hardware.

After the video data preparing processing (step S12) as described above ends, a video displaying processing is performed (step S13). In step S13, the display driver 15 causes the video display 11 to display the videos VD by reading out the video data stored in the frame buffer 18, and driving the video display 11 on the basis of the video data. Note that the processing procedure of FIG. 6 is performed in synchronization with a processing cycle determined based on a frame rate. For example, the processing cycle is 16.6 ms at a frame rate of 60 fps. Further, the processing procedure in displaying the videos VD is not particularly limited to that of FIG. 6, and may be replaced with various well-known procedures.

Figure 7:
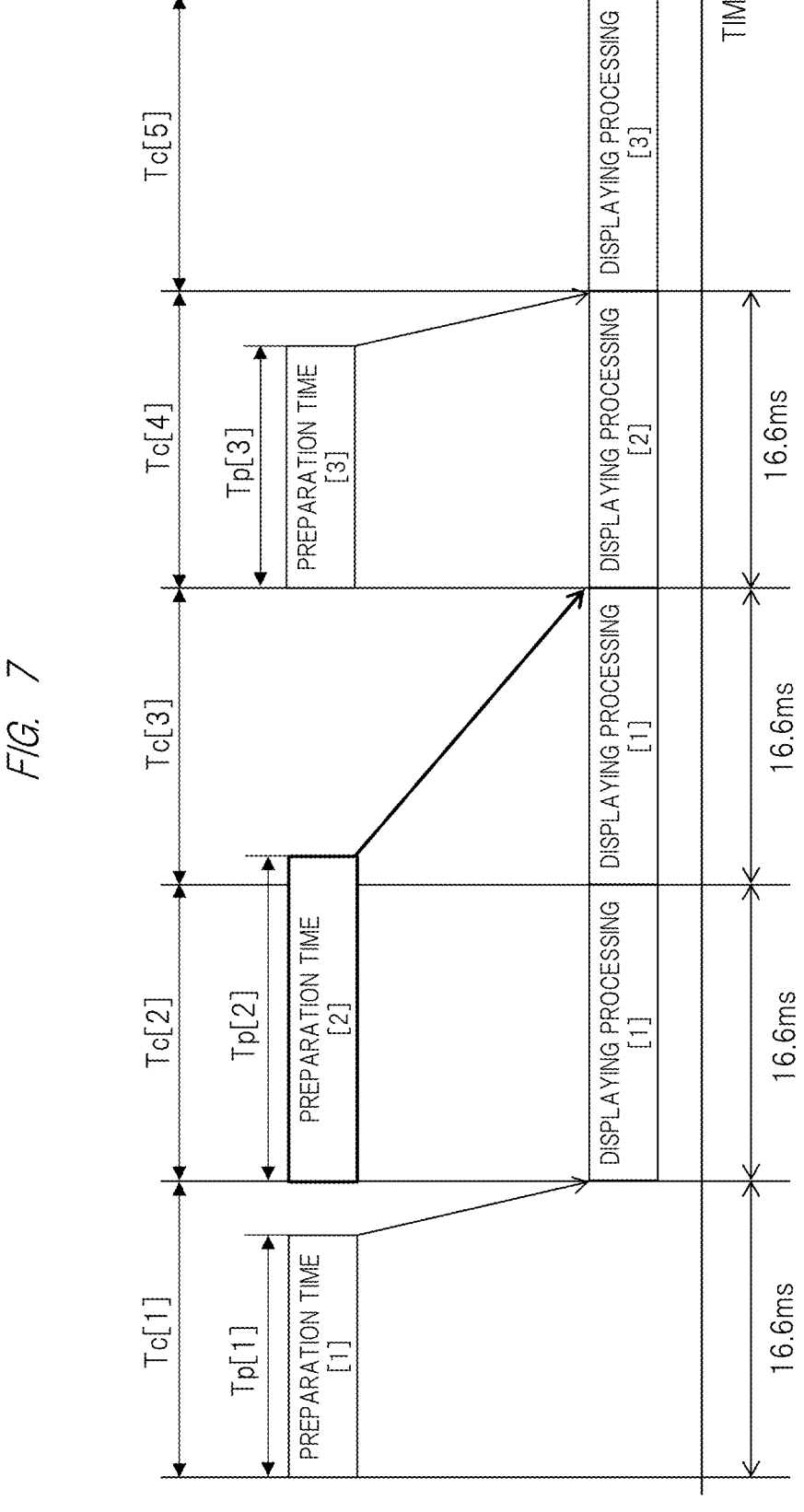
FIG. 7 is a timing chart schematically illustrating an exemplary problem in displaying the video in the flow of FIG. 6.

FIG. 7 is a timing chart schematically illustrating exemplary problems in displaying the videos in the flow of FIG. 6. FIG. 7 illustrates the operations performed in the first to fifth processing cycles or control cycles Tc[1] to Tc[5]. In the present specification, the processing cycles or control cycles Tc[1] to TC [5] are collectively referred to as processing cycle or control cycle Tc. The control cycle Tc is, for example, 16.6 ms. FIG. 7 further illustrates the operations in a case in which the processings in steps S11 and S12 and the processing in step S13 in FIG. 6 are performed in pipeline processing.

In FIG. 7, in the first control cycle Tc[1], the transportation information is acquired, (step S11) and the video data is prepared on the basis of the information (step S12). A video data preparation time Tp[1] required for the processings in steps S11 and S12 is shorter than the control cycle Tc[1]. In this case, for example, the number of the AR target objects, consequently the number of videos VD to be displayed is small such that the preparation time Tp[1] is within the control cycle Tc[1]. Similarly, also in the second control cycle Tc[2], the transportation information is acquired (step S11), and the video data is prepared on the basis of the information (step S12). Additionally, at the same time, in the second control cycle Tc[2], a processing of displaying the videos VD is performed on the basis of the video data prepared in the first control cycle Tc[1] (step S13).

Here, in the second control cycle Tc[2], a video data preparation time Tp[2] required for the processings in steps S11 and S12 is longer than the control cycle Tc[2]. The preparation time Tp[2] can be lengthened by, for example, increase in the number of the AR target objects, consequently the number of the videos VD to be displayed. Thus, the video data cannot be reflected on a displaying processing in the third control cycle Tc[3], and is reflected on a displaying processing in the fourth control cycle Tc[4]. Consequently, the drop frame is caused in the third control cycle Tc[3].

Further, in the fourth control cycle Tc[4], a video data preparation time Tp[3] required for the processings in steps S11 and S12 is shorter than the control cycle Tc[4]. Thus, the video data is reflected on a displaying processing in the fifth control cycle Tc[5]. However, due to the drop frame, the video data prepared in the preparation time Tp[3] may be video data to be originally prepared in the third control cycle Tc[3], depending on a system. In the present specification, note that the plurality of the preparation time Tp[1] to Tp[3] is collectively referred to as preparation time Tp.

Figure 8A:
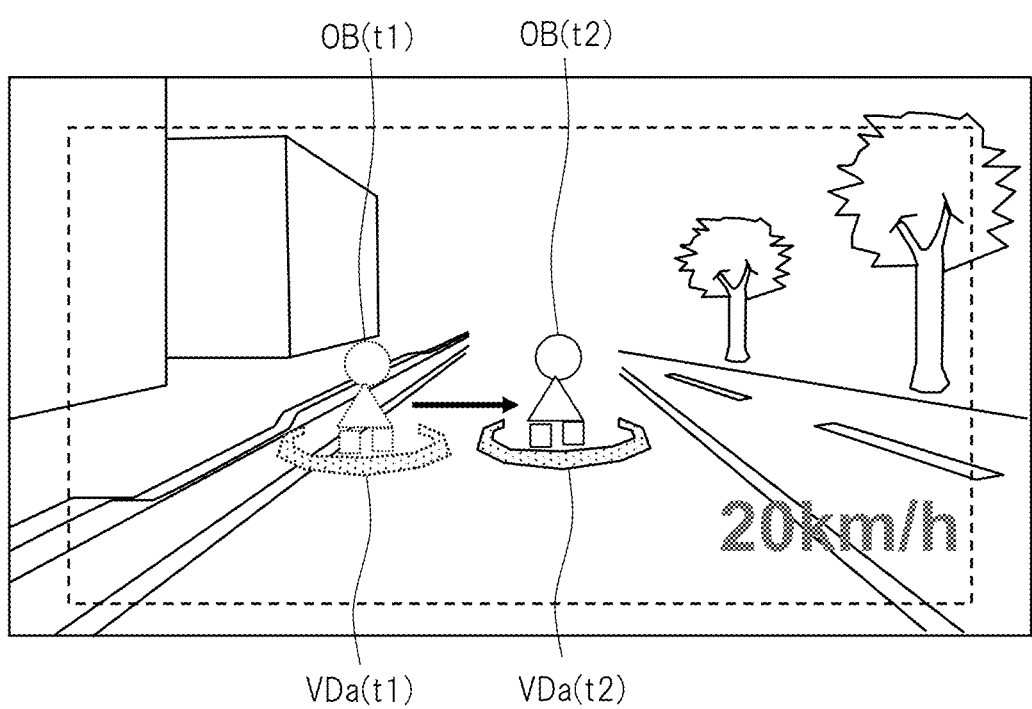
FIG. 8A is a schematic diagram illustrating a state of display contents change in a case without drop frame.
Figure 8B:
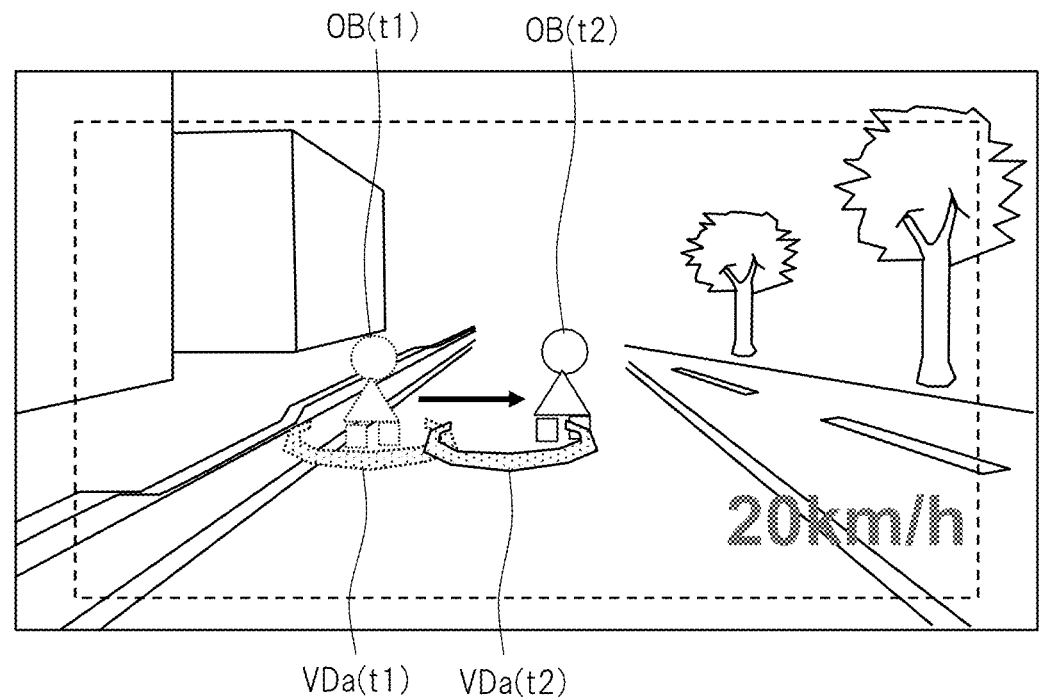
FIG. 8B is a schematic diagram illustrating a state of display contents change in a case with the drop frame.

FIG. 8A is a schematic diagram illustrating a change state of the display contents change in a case without the drop frame. FIG. 8B is a schematic diagram illustrating a change state the display contents change in a case with the drop frame. For example, as illustrated in FIGS. 8A and 8B, it is assumed that an object OB that is a person here moves during time t1 to time t2. In the case without the drop frame, as illustrated in FIG. 8A, for an object OB (t1) positioned at the time t1, a video VDa (t1) is displayed to be superimposed on a position of the object OB (t1), and a video VDa (t2) is displayed to be superimposed on a position of an object OB (t2) positioned at the time t2.

As described above, in the case without the drop frame, the videos VD having high real time performance may be displayed to follow the AR target object. To the contrary, in the case with the drop frame, particularly a case with the drop frames in control cycles Tc in a row, for an object OB (t2) positioned at the time t2, the video VDa (t2) is displayed at a position shifting from its position to the object OB (t1) as illustrated in FIG. 8B. In this case, the video VDa (t2) is not completely superimposed on the object OB (t2). As described above, in the case with the drop frame, the videos VD having lower real time performance may be displayed not to follow the AR target object.

<General Operations of Controller>

Thus, in order to display the videos VD having the high real time performance, the controller 20 generally performs control to reduce a processing load required for preparing the video data such that the video data is completely prepared within a predetermined processing cycle or control cycle Tc. That is, the controller 20 prepares the video data on the basis of the transportation information received by the communication portion 16, and if a condition for preparing the video data does not meet a predetermined condition within the predetermined processing cycle, prepares video data with its contents partially changed. More specifically, the controller 20 monitors the preparation time Tp required for preparing the video data, and if the preparation time Tp meets the predetermined condition, starts the control to reduce the processing load. Additionally, the predetermined processing cycle or control cycle Tc is set on the basis of the frame rate.

In an assumption with an operation system as illustrated in FIG. 7, the preparation time Tp is a time required for the processings in steps S11 and S12 of FIG. 6. To the contrary, in an assumption with, for example, an operation system in which the processing in step S11 and the processing in step S12 are performed in pipeline processing, the preparation time Tp may be a time required for the processing in step S12. However, the operation system as illustrated in FIG. 7 is desirably employed for achieving the real time performance.

The controller 20 sequentially monitors the preparation time Tp. For example, the preparation time can be monitored in conjunction with the time of the vehicle or by use of a timer or the like. In the assumption with the operation system as illustrated in FIG. 7, by use of the timer or the like, the controller 20 monitors the preparation time Tp required from the start of the acquisition of the transportation information by the communication portion 16 to the end of the writing down of the created video data to the frame buffer 18 as illustrated in FIG. 3A. In a case of the configuration of FIG. 3B as different from the configuration of FIG. 3A, the communication processing portion 16a monitors, by use of the timer or the like, the preparation time Tp required from the acquisition of the information from the control unit 21 through the processing of the acquired information to the end of the writing down of the processing result to the frame buffer 18.

Figure 10:
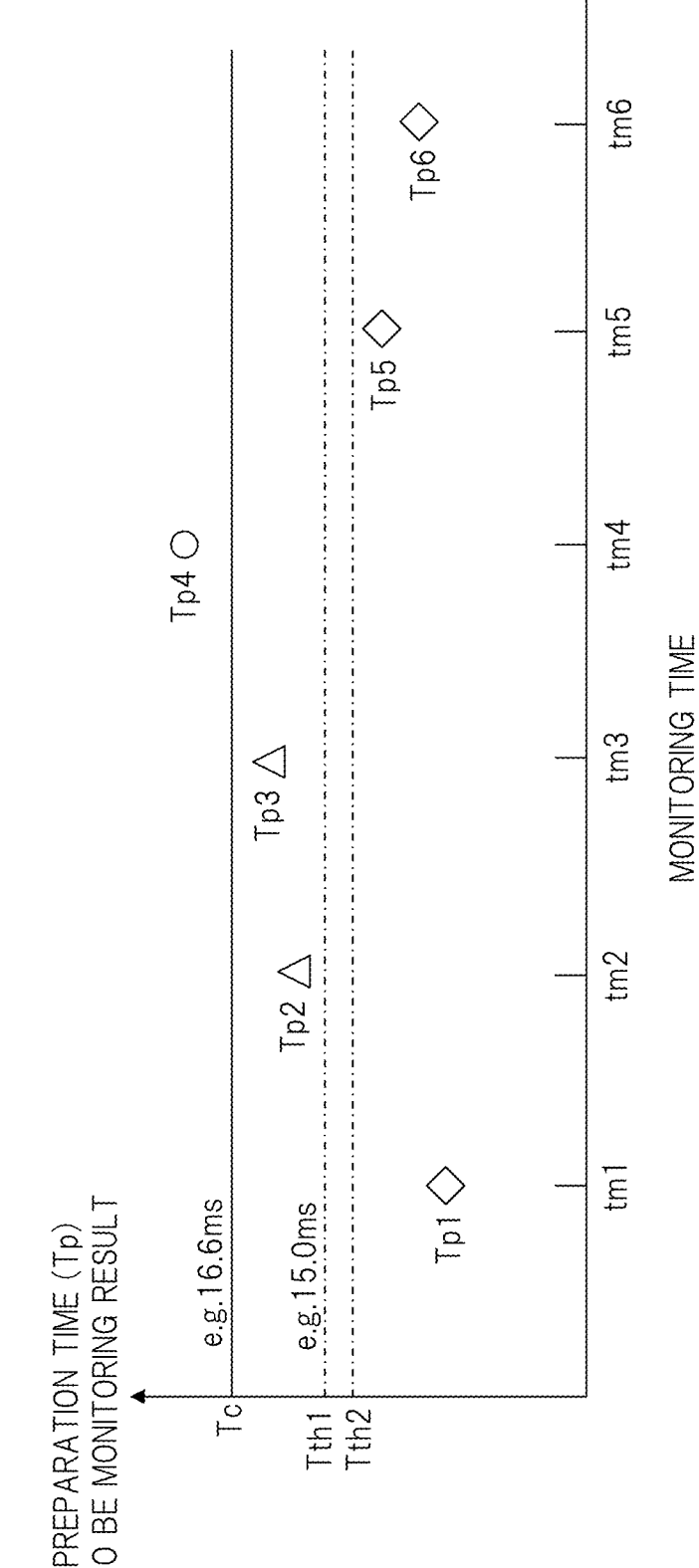
FIG. 10 is a diagram illustrating an exemplary monitoring result of a preparation time, monitored by the controller of FIG. 3A.

FIG. 9 is a diagram illustrating exemplary internal states of the controller of FIG. 3A. FIG. 10 is a diagram illustrating exemplary monitoring results of the preparation time monitored by the controller of FIG. 3A. As illustrated in FIG. 9, the internal states of the controller 20 include a normal state ST0, a restoration transit state ST1, a suppression transit state ST2, and a suppression state ST3. In other words, the operation modes of the controller 20 include the normal mode ST0, the restoration transit mode ST1, the suppression transit mode ST2, and the suppression mode ST3. The four states are one example. In another example, the controller 20 may include two states that are the normal state ST0 and the suppression state ST3.

In the normal state ST0, the controller 20 normally prepares the video data on the basis of the information acquired by the communication portion 16, and causes the video display 11 to display the videos VD based on the video data. Further, in the normal state ST0, (A) if the preparation time Tp as the monitoring result is longer than the control cycle Tc or (B) if the preparation time Tp is longer than a first threshold time Tth1 in a plural number of times in a row, the state of the controller 20 transits to the suppression transit state ST2. The number of times in a row is set as, for example, a value to be equal to or more than twice and equal to or less than ten times.

As a specific example, a preparation time Tp4 acquired at monitoring time tm4 is longer than the control cycle Tc in FIG. 10. Additionally, each of a preparation time Tp2 and preparation time Tp3 acquired at monitoring times tm2 and tm3 in a row is shorter than the control cycle Tc but is longer than the first threshold time Tth1. The first threshold time Tth1 is shorter than the control cycle Tc of 16.6 ms, and is, for example, 15.0 ms.

In the normal state ST0, (A) if the monitoring result is acquired as the preparation time Tp4 or (B) if the monitoring result is acquired in a plural number of times in a row such as the preparation time Tp2 and Tp3, for example, if the monitoring result is acquired twice in a row, the state of the controller 20 transits to the suppression transit state ST2. The condition (A) is to rapidly eliminate the drop frame. To the contrary, the condition (B) is to previously avoid a state in which the preparation time Tp is longer than the control cycle Tc in near future, consequently a state with the drop frame.

In the suppression transit state ST2, the controller 20 starts the control to reduce the processing load, and then, increases stepwise the reduction amount of the processing load for each control cycle Tc within a predetermined suppression transit period. The suppression transit period is set to, for example, five seconds. As described in detail later, the controller 20 decreases the amount of the video data to be prepared, and reduces the processing load by, for example, canceling the creation of part of the video data or simplifying part of the video data. In this case, if the amount of the video data is rapidly decreased, the rapid decrease is not preferable for the point of view of the user 6 since the display contents also rapidly change. Thus, the controller 20 increases stepwise the amount of data to be decreased. Then, the state of the controller 20 transits to the suppression state ST3 after the suppression transit period that is five seconds or the like.

In the suppression state ST3, the controller 20 prepares the video data at the reduced processing load. Further, in the suppression state ST3, when a state of the preparation time Tp shorter than a second threshold time Tth2 is continued for a predetermined threshold duration TthD or longer, the state of the controller 20 transits to the restoration transit state ST1. The second threshold time Tth2 is shorter than the control cycle Tc, and is set to be, for example, equal to or shorter than the first threshold time Tth1. The threshold duration TthD is a period of multiple times of the control cycle Tc or longer, and is set as, for example, five seconds.

As a specific example, in FIG. 10, the second threshold time Tth2 is set to be shorter than the first threshold time Tth1. Each of a preparation time Tp5 and a preparation time Tp6 acquired at monitoring time tm5 and tm6 is shorter than the second threshold time Tth2. When the monitoring result is acquired in a row as the preparation time Tp5 and Tp6 for the threshold duration TthD or longer, the state of the controller 20 transits to the restoration transit state ST1.

As described above, when the state of "preparation time Tp<second threshold time Tth2" is stable, it is expected that even the restoration of the state to the normal state ST0 does not meet the condition (A) and the condition (B). In some cases, in assumption that the processing load is naturally reduced after a predetermined period, the state of the controller 20 may transit to the restoration transit state ST1 simply after five seconds or the like without making the condition determination.

In the restoration transit state ST1, the controller 20 decreases stepwise the reduction amount of the processing load for each control cycle Tc within a predetermined restoration transit period. The restoration transit period is set to, for example, five seconds or the like. Then, after the restoration transit period that is, for example, five seconds or the like, the state of the controller 20 transits to the normal state ST0. By the restoration transit state ST1, undesirable situations for the line of sight of the user 6 can be avoided as similar to the suppression transit state ST2.

<Method of Reducing Processing Load>

Figure 11A:
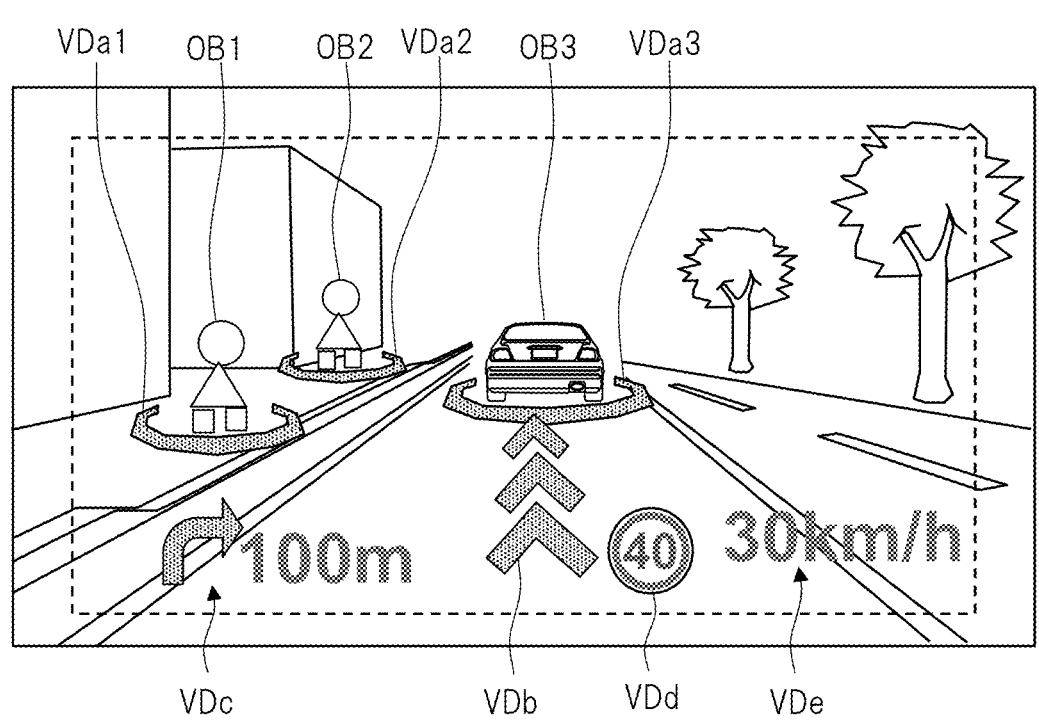
FIG. 11A is a schematic diagram illustrating an exemplary display content of the HUD apparatus in a normal state of FIG. 9.

FIG. 11A is a schematic diagram illustrating exemplary display contents of the HUD apparatus in the normal state of FIG. 9. In the normal state ST0, for example, seven videos VDa1 to VDa3 and VDb to VDe are displayed as illustrated in FIG. 11A. The videos VDa1 and VDa2 are displayed to be superimposed on the objects OB1 and OB2 as persons here, respectively. The video VDa3 is displayed to be superimposed on the object OB3 as a vehicle here. The videos VDb to VDe indicate the navigation information, the traveling direction, the road sign, and the speed information, respectively, as similar to those of FIG. 5.

Figure 11B:
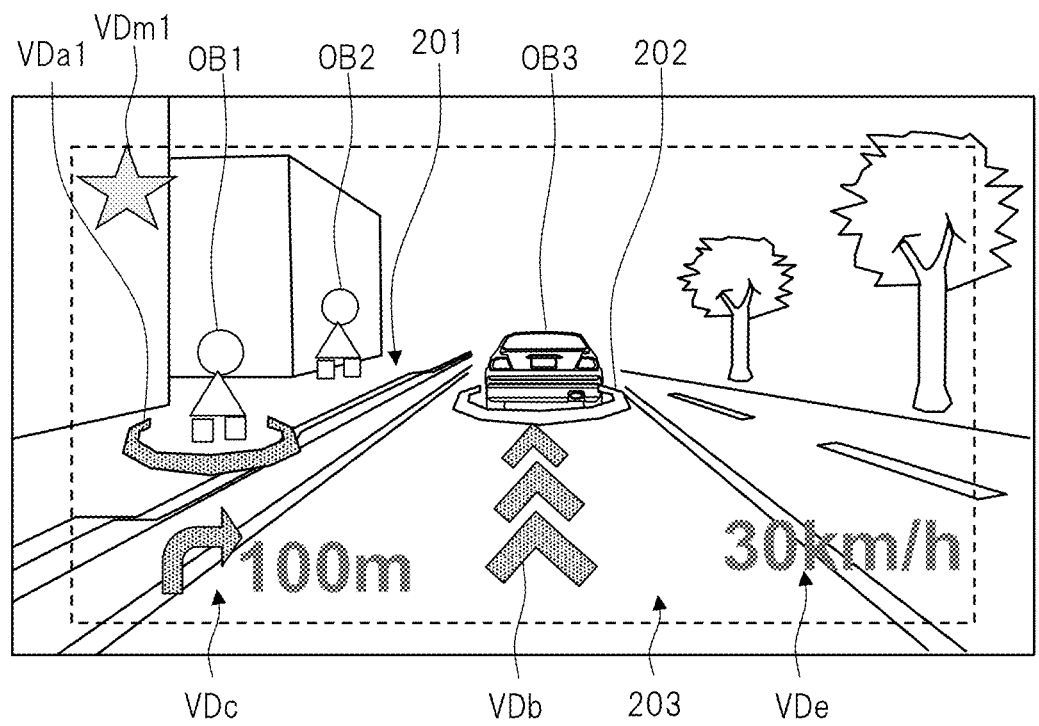
FIG. 11B is a schematic diagram illustrating an exemplary display content of the HUD apparatus in a suppression transit state of FIG. 9.

FIG. 11B is a schematic diagram illustrating exemplary display contents of the HUD apparatus in the suppression transit state of FIG. 9. In the suppression transit state ST2, two videos VDa2 and VDd based on the display contents of FIG. 11A are deleted, as illustrated with reference symbols 201 and 203 in FIG. 11B, respectively. That is, the video VDa2 superimposed on the object OB2 farther than the object OB1, and the video VDd indicating the road sign are deleted. Additionally, as illustrated with a reference symbol 202 in FIG. 11B, the video VDa3 of FIG. 11A is simplified by being displayed with no color or the like.

Further, a video VDm1 such as a mark for notifying the user 6 of the suppression transit state ST2, in other words, the suppression transit period is displayed in FIG. 11B. In the suppression transit state ST2, the controller 20 writes down the video data of the video VDm1 as a template to a fixed storage region of the frame buffer 18. Through the display of such a mark, the user 6 can recognize not the change in display contents due to a failure but the change in display contents due to the activation of the display suppression function.

In the case of the display illustrated in FIG. 11B, in step S121 of FIG. 6, the controller 20 reduces the amount of the video data to be prepared in step S12 by hiding the videos VDa2 and VDd, and applying the simple display to the video VDa3. Thereby, the controller 20 reduces the processing load required for preparing the video data. That is, the controller 20 reduces a time required for the processing in step S122 or a time required for the processing in step S123. Additionally, the controller 20 reduces stepwise the amount of data as described above.

Figure 11C:
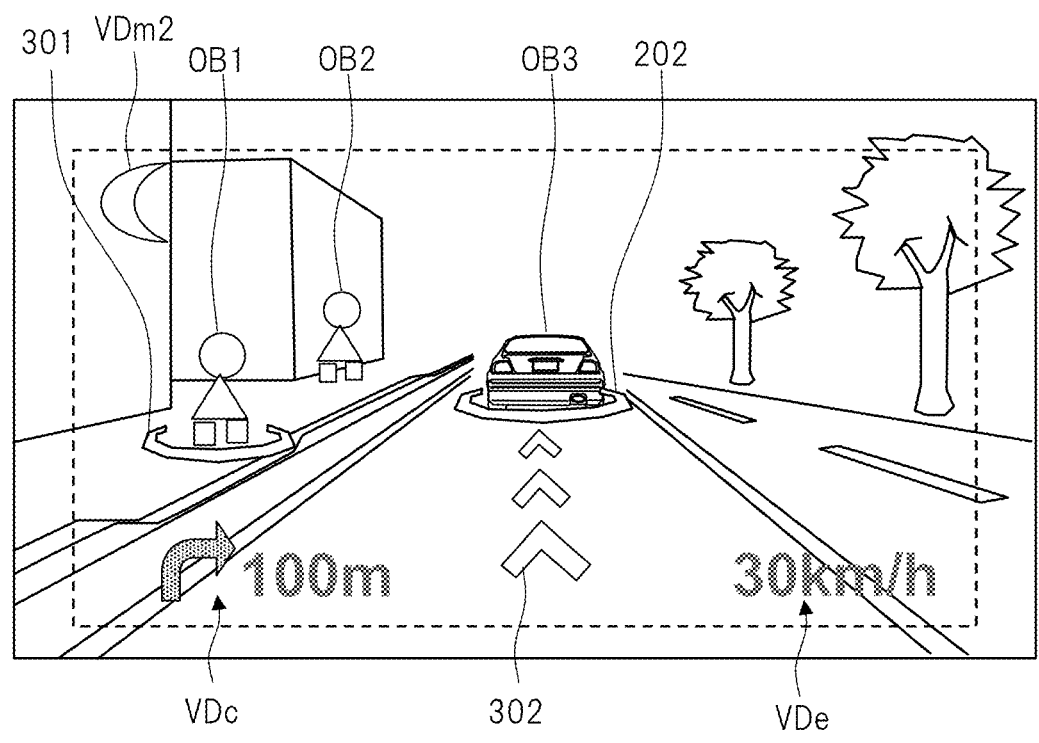
FIG. 11C is a schematic diagram illustrating exemplary display contents of the HUD apparatus in a suppression state of FIG. 9.

FIG. 11C is a schematic diagram illustrating exemplary display contents of the HUD apparatus in the suppression state of FIG. 9. In the suppression state ST3, two videos VDa1 and VDb based on the display contents of FIG. 11B are further simplified as illustrated with reference symbols 301 and 302 in FIG. 11C, respectively. That is, the two videos VDa1 and VDb are displayed with no color or to be reduced in size to be simplified. Further, in FIG. 11C, a video VDm2 such as a mark for notifying the user 6 of the suppression state ST3, in other words, the suppression period is displayed.

As an exemplary specific processing, in the memory 17, the controller 20 previously stores a suppression table of defining correspondences between types and priorities of the vehicle information 4. For example, in the suppression transit state ST2, on the basis of the suppression table, the controller 20 selects the vehicle information 4 in ascending order of the priority, and increases stepwise the number of items to be selected. Then, the controller 20 hides the video VD indicating the selected vehicle information 4 or simplifies the display by using a predetermined method.

In this case, the priorities in the suppression table are defined on the basis of, for example, the following criteria. First, the vehicle information 4 with a larger contribution to safe driving is defined to have a higher priority. Further, if the vehicle information 4 indicates the alert, the vehicle information 4 for alerting the user to a person as an alert object is defined to have a higher priority than that for alerting the user 6 to another vehicle as the alert object. However, in this case, the priorities may be weighted depending on a distance between the user's vehicle and the object. For example, if the distance to the person is large while the distance to another vehicle is very small, then, the vehicle information 4 for another vehicle may be defined to have a higher priority. Alternatively, the vehicle information 4 for a person who approaches the user's vehicle may be defined to have a higher priority than that for a person who goes away therefrom.

Further, regarding the video VDb indicating the traveling direction illustrated in FIGS. 11B and 11C, for example, on the basis of the navigation information, its priority may be lower if a long straight road is continued, and its priority may be higher if the user's vehicle is near a point to turn right or left. Furthermore, regarding the video VDb, on the basis of the past traveling history, its priority may be lower if the user's vehicle travels on a road on which the driver has frequently traveled, and its priority may be higher if the user's vehicle travels on a road on which the driver has never traveled. Alternatively, the video VDd indicating the road sign that is a speed limit illustrated in FIGS. 11A and 11B may be changed in its priority depending on the difference between the traveling speed of the user's vehicle and the speed limit.

Note that the controller 20 may reduce the processing load without the complete deletion of the videos VD by, for example, displaying the videos VD once for each several control cycles Tc. Further, the controller 20 may reduce the processing load not only by reducing the data amount of the video data as described above but also by, for example, simplifying the distortion correcting processing in step S124 of FIG. 6, consequently decreasing the accuracy.

<Detailed Operations of Controller>

Figure 12:
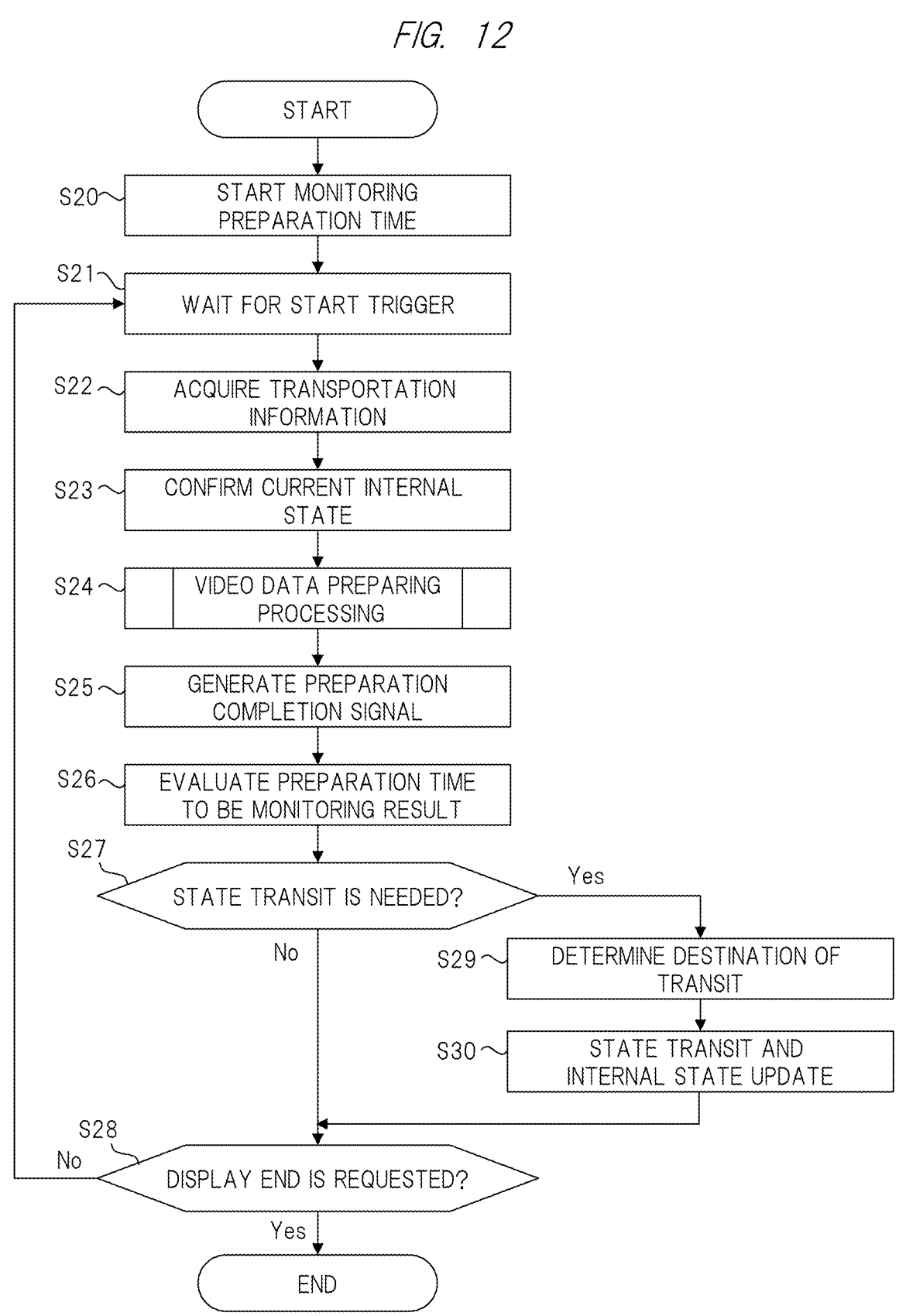
FIG. 12 is a flowchart illustrating an exemplary processing content of the controller of FIG. 3A.

FIG. 12 is a flowchart illustrating exemplary processing contents of the controller of FIG. 3A. For example, the controller 20 performs the flow of FIG. 12 when, for example, the preparation for projecting the video is made after the installation angle of the mirror M1 of FIG. 2A is completely adjusted. In FIG. 12, the controller 20 starts monitoring the preparation time Tp while using a timer or the like (step S20). Subsequently, the controller 20 waits for a start trigger to be caused (step S21). The start trigger is generated for each control cycle Tc.

When the start trigger is caused in step S21, the controller 20 acquires the transportation information by the communication portion 16 as the information acquiring portion (step S22). Next, the controller 20 checks a current internal state illustrated in FIG. 9 (step S23). Then, the controller 20 performs the video data preparing processing (step S24) as described in step S12 of FIG. 6. When this stage is in an internal state other than the normal state ST0, the controller 20 reduces the processing load required for preparing the video data as illustrated in FIGS. 9, 11B, and 11C.

When completing the video data preparing processing in step S24, the controller 20 generates a preparation completion signal (step S25). The controller 20 outputs a display start instruction to the display driver 15 in response to, for example, the start trigger after generating the preparation completion signal. The display driver 15 performs the processing of displaying the videos VD as illustrated in step S13 of FIG. 6 and in FIG. 7 in response to the display start instruction. Further, when completing the video data preparing processing, the controller 20 evaluates the preparation time Tp as a monitoring result in step S21 (step S26).

Then, on the basis of the preparation time Tp as the monitoring result, the controller 20 determines whether the state transit illustrated in FIG. 9 is needed (step S27). If the state transit is needed (step S27: Yes), the controller 20 determines a destination of the transit (step S29), transits its state to the determined destination of the transit, and additionally updates the internal state (step S30). To the contrary, if the state transit is not needed (step S27: No), the controller 20 returns the flow to step S21, and repeatedly performs the similar processings while waiting for the next start trigger (step S28) until a request to end the HUD display is made.

Principal Effects of First Embodiment

The system according to the first embodiment as described above performs the control for reducing the processing load required for preparing the video data such that the video data is completely prepared within the control cycle Tc, thereby suppressing the drop frame or the like to secure minimal display quality. Specifically, even if the HUD apparatus 1 is designed to avoid the drop frame or the like, the processing load may be increased by updating of a software or the like due to change in display specification, thereby causing the drop frame or the like. Even in such a case, the system according to the first embodiment can suppress the drop frame or the like. Consequently, the required display specification can be met as much as possible, and various display specifications can be flexibly supported within the range of hardware processing performance.

Second Embodiment

The system according to the first embodiment is to reduce the processing load such that the video data or the image data is completely prepared within the control cycle Tc that is the processing cycle, by actually monitoring the preparation time Tp required for preparing the video data or the image data. A system of a second embodiment will be described, the system being to reduce the processing load such that the video data or the image data is completely prepared within the control cycle Tc that is the processing cycle by predicting the preparation time Tp. The following description will be made with reference to the video data.

<Video Data Preparing Processing>

Figure 13A:
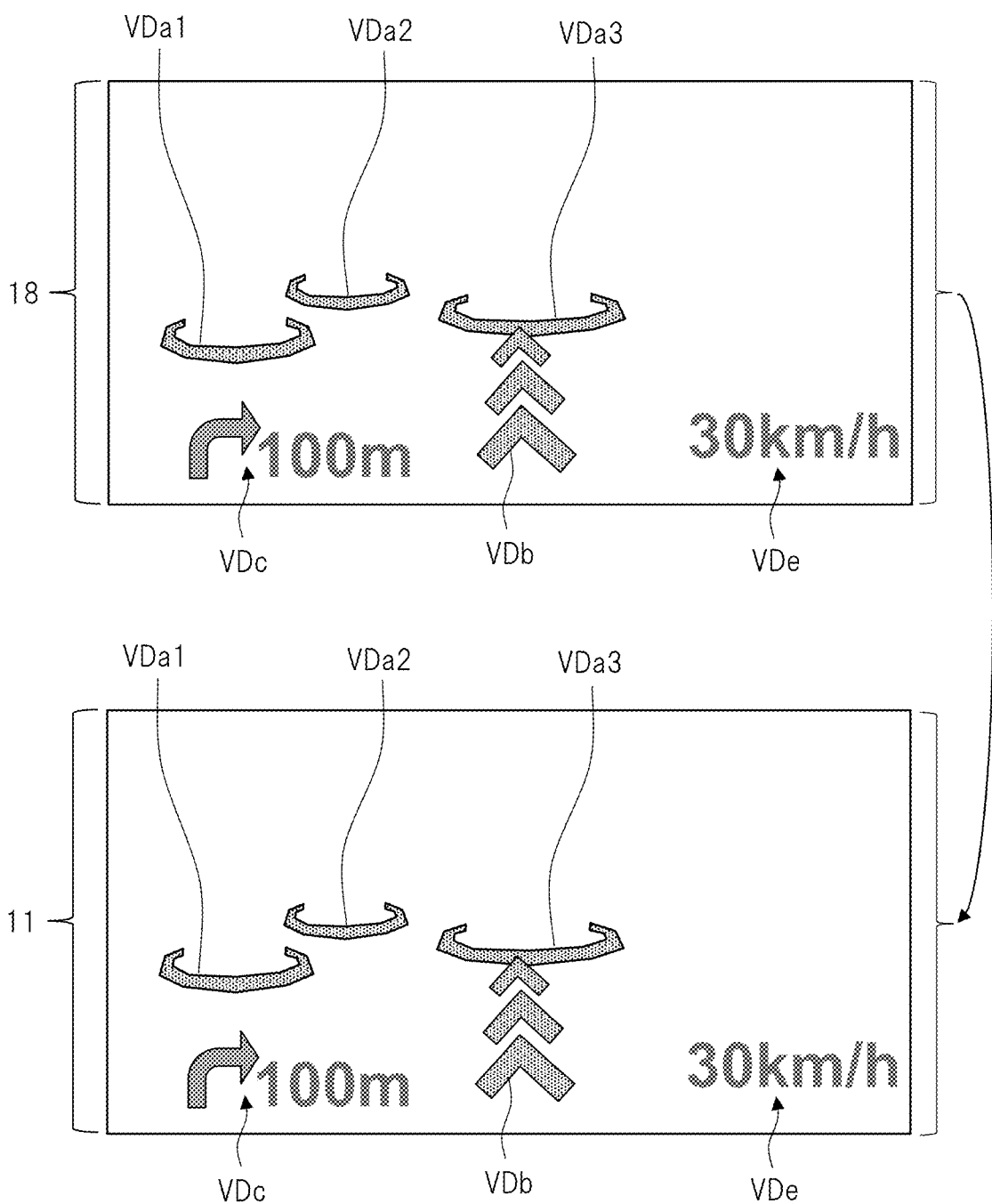
FIG. 13A is a schematic diagram illustrating an exemplary relationship between video data written in a frame buffer and a display content displayed on a video display in the HUD apparatus of FIGS. 3A and 3B.
Figure 13B:
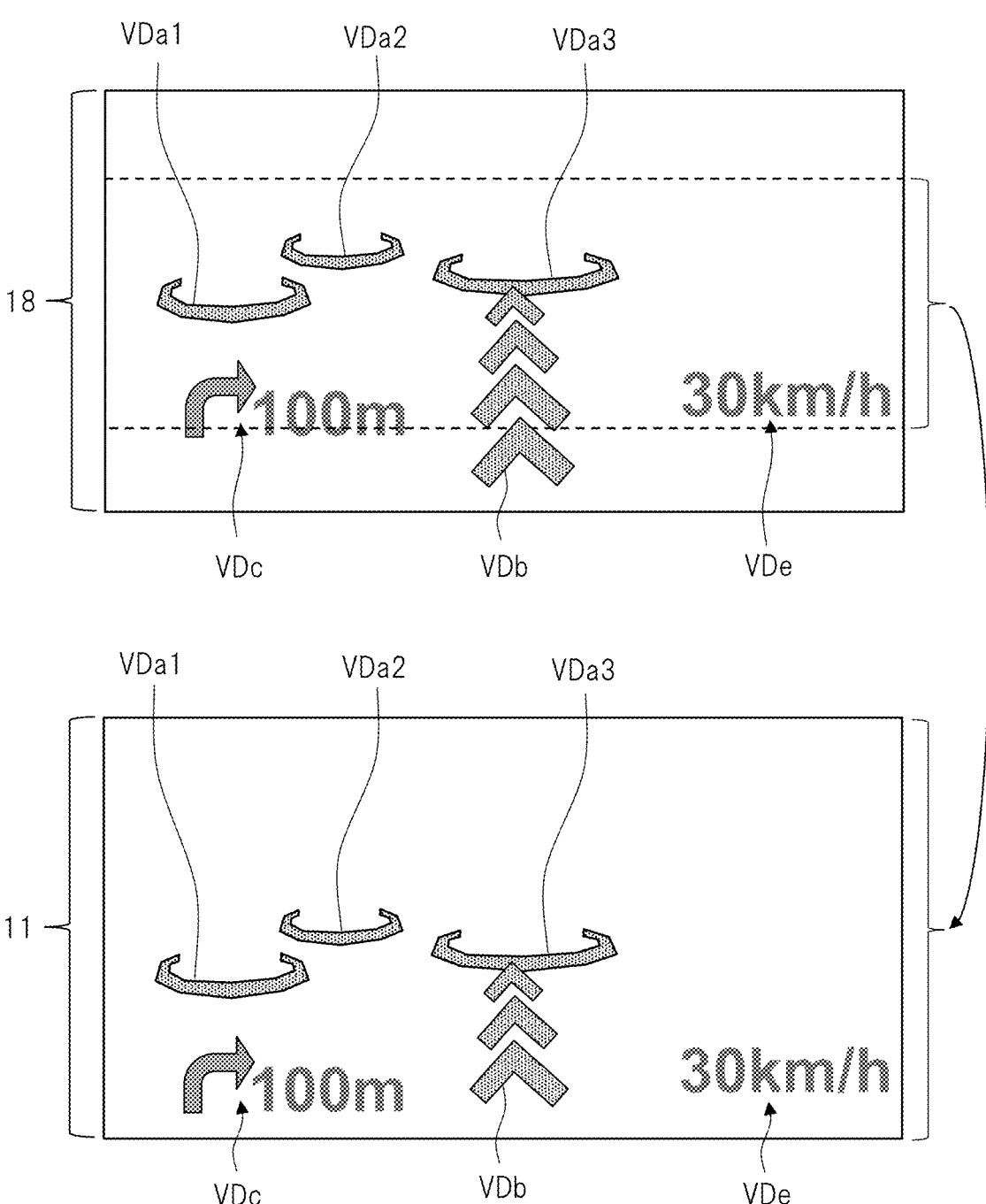
FIG. 13B is a schematic diagram illustrating an exemplary relationship different from that of FIG. 13A.

FIG. 13A is a schematic diagram illustrating an exemplary relationship between the video data written down to the frame buffer and the display contents displayed on the video display in the HUD apparatus illustrated in FIGS. 3A and 3B. FIG. 13B is a schematic diagram illustrating an exemplary relationship different from that of FIG. 13A. For example, as illustrated in FIG. 6, in the video data preparing processing (step S12), the video data based on the determined display contents is written down to the frame buffer 18 (steps S122 and S123).

In FIG. 13A, six videos VDa1 to VDa3, VDb, VDc, and VDe are written down as the video data to the storage regions in the frame buffer 18 to correspond to the display positions, respectively. As illustrated in FIG. 5, the videos VDa1 to VDa3 are the alert videos superimposed on the sensed objects. The video VDb indicates the travelling direction of the vehicle, the video VDc indicates the navigation information, and the video VDe indicates the speed information of the vehicle. Further, for example, the videos VDa1 to VDa3 and VDb are of 3D graphics, and the videos VDc and VDe are of 2D graphics.

Here, in the example of FIG. 13A, the size of the frame buffer 18 is equal to the size of the video display 11. In this case, all the videos VD that are the video objects VD written down to the frame buffer 18 are displayed at original (non-change) positions on the video display 11. To the contrary, in the example of FIG. 13B, the size of the frame buffer 18 is larger than the size of the video display 11. In this case, the videos VD written down to the frame buffer 18 are partially displayed on the video display 11.

In FIG. 13B, for a case of, for example, an up/down movement of the display due to pitching correction, the videos VD are arranged also in other regions of the frame buffer 18 than the display region of the video display 11. In this case, the magnitude of the processing load required for the preparing processing is defined depending on how many videos VD are arranged in the entire frame buffer 18 including the other regions than the display region of the video display 11.

FIG. 14 is a diagram illustrating exemplary items affecting the video data preparation time in FIG. 6. As the items affecting the preparation time, the number of videos VD and a display format of each video VD are exemplified. The larger the number of videos VD is, the larger the processing load is, consequently the longer the preparation time Tp is. The display format of each video VD includes items such as size, display position, design type, and distortion correction.

The larger the size is, the longer the preparation time Tp is. And, generally, the nearer to the foreground the display position is, in other words, the nearer the display position is, then, the larger the size is, and therefore, the longer the preparation time Tp is. The design type includes, for example, the type of 2D/3D graphics, a type with/without gradation, and the like. For example, the more complicated the design is such that the 3D graphics with the higher polygon count is used and the gradation is used, the longer the preparation time Tp is. Further, the preparation time Tp due to the distortion correction is shorter when the distortion correction is made on the hardware, or is longer when the distortion correction is made on the software as also illustrated in FIG. 6.

Figure 15:
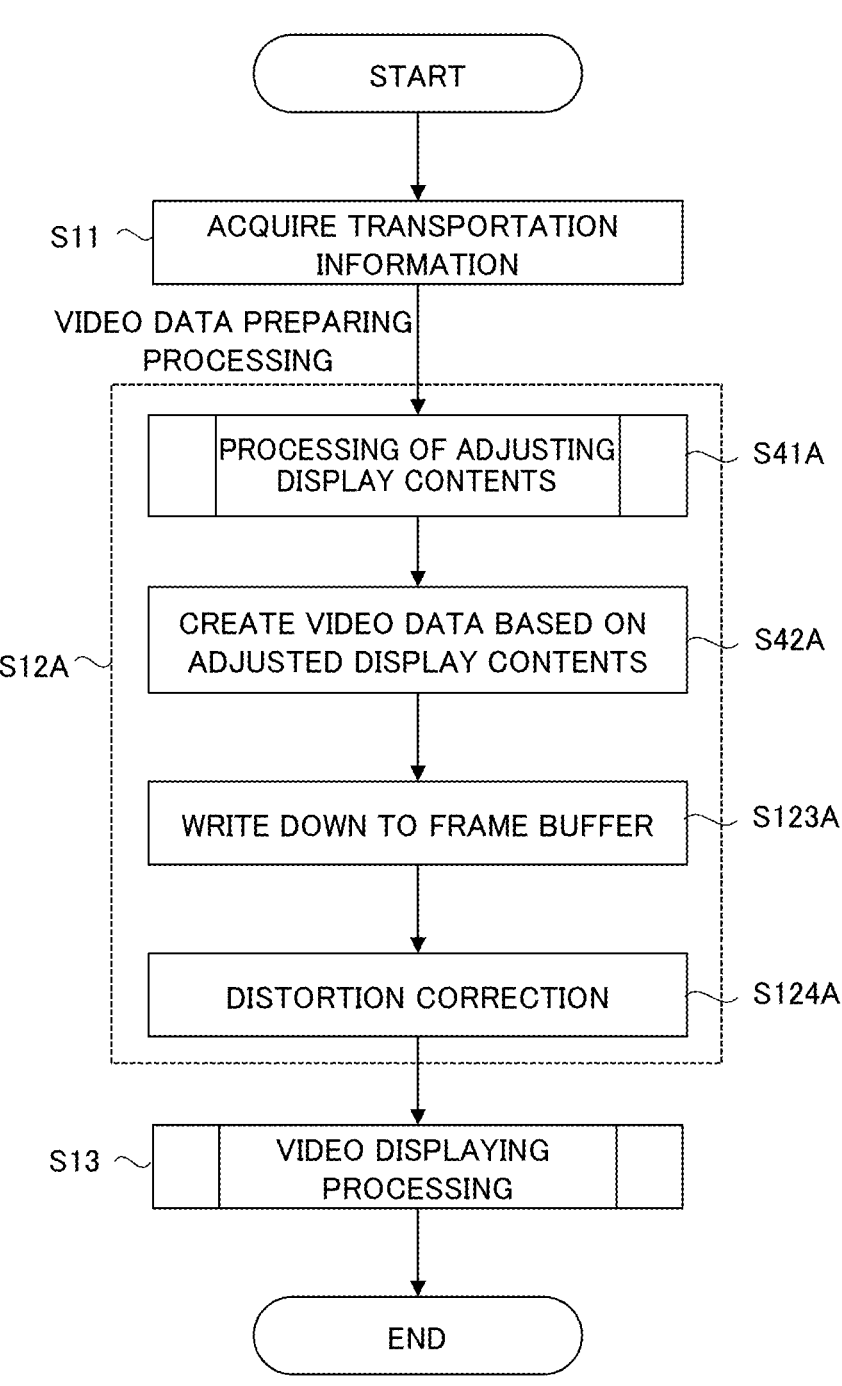
FIG. 15 is a flowchart illustrating an exemplary processing procedure in displaying a video in an HUD apparatus according to a second embodiment.

FIG. 15 is a flowchart illustrating an exemplary processing procedure in displaying the video in the HUD apparatus according to the second embodiment. The HUD apparatus 1 according to the second embodiment is achieved by the configuration of FIG. 3A or 3B. FIG. 15 illustrates the flow similar to that of FIG. 6. That is, as similar to FIG. 6, the controller 20 determines the display contents on the basis of the transportation information acquired by the communication portion 16 that is the information acquiring portion, prepares the video data based on the determined display contents, and causes the video display 11 to display the video based on the prepared video data.

However, as different from FIG. 6, in FIG. 15, the controller 20 adjusts the display contents as needed, and then, determines the display contents. Thus, FIG. 15 is slightly different from FIG. 6 in the contents of the video data preparing processing (step S12A). That is, in step S12A of FIG. 15, the controller 20 first determines the display contents by performing a processing of adjusting the display contents (step S41A), and then, creates the video data on the basis of the adjusted display contents (step S42A). Then, as similar to FIG. 6, the controller 20 writes down the created video data to the frame buffer 18 (step S123A), and makes the distortion correction by using the hardware processing or the software processing (step S124A).

Figure 16:
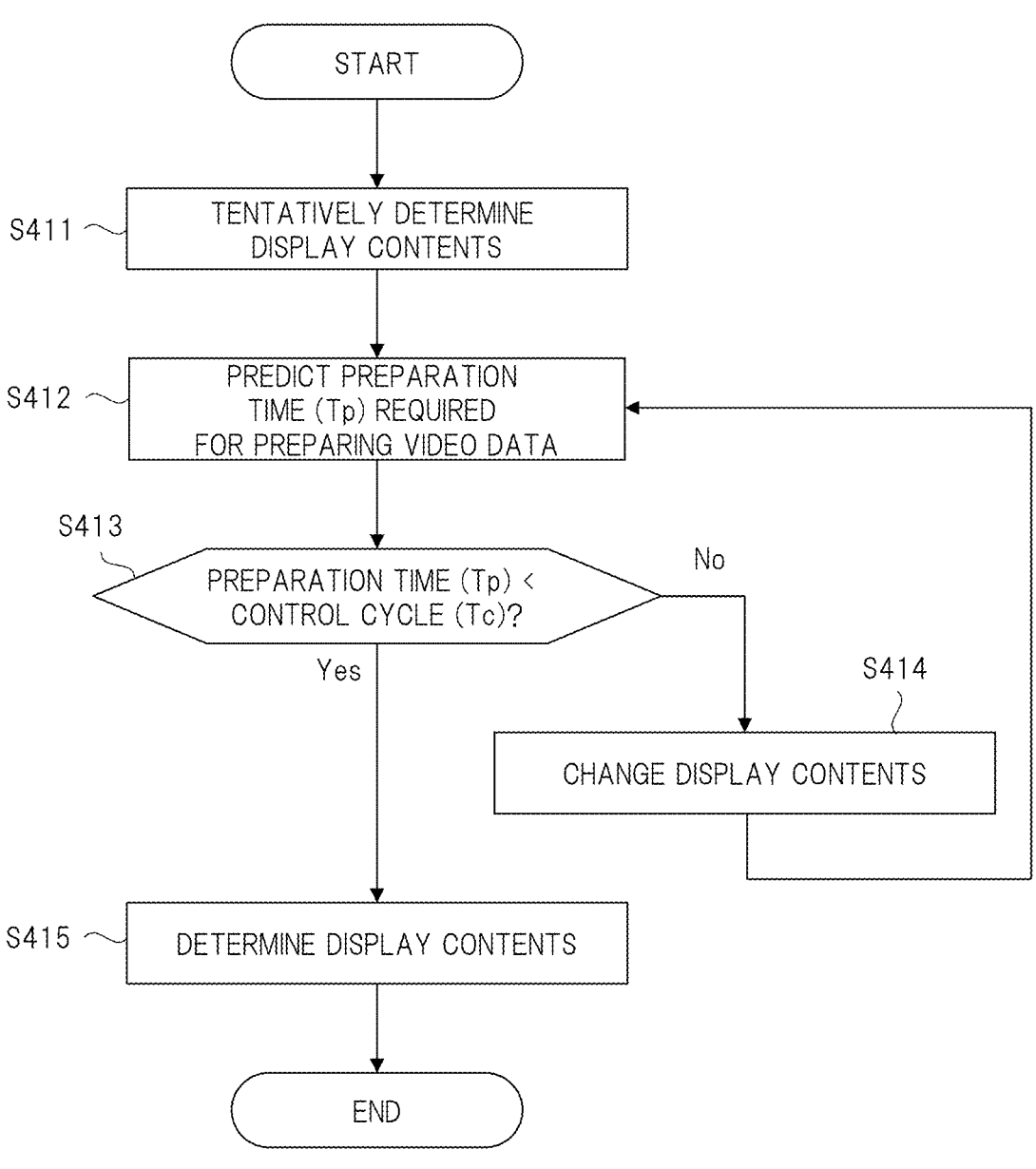
FIG. 16 is a flowchart illustrating an exemplary detailed processing content of a processing of adjusting a display content of FIG. 15.

FIG. 16 is a flowchart illustrating exemplary detailed processing contents of the processing of adjusting the display contents (step S41A) of FIG. 15. Although described in detail later, as a prerequisite condition, the controller 20 previously causes the memory 17 or the like to store predicted time information for defining a relationship between the display contents such as difference in the display contents and a predicted time required for preparing the video data. Under the prerequisite condition, first, the controller 20 tentatively determines the display contents (step S411) before determining the display contents, on the basis of the transportation information acquired in step S11 of FIG. 15. Subsequently, on the basis of the predicted time information, the controller 20 predicts the preparation time Tp required for preparing the video data based on the tentatively-determined display contents that are also called tentative display contents, (step S412).

Next, the controller 20 determines whether the preparation time Tp predicted in step S412 is shorter than a predetermined control cycle Tc that is the processing cycle (step S413). If the preparation time Tp is longer than the control cycle Tc (step S413: No), the controller 20 changes the tentatively-determined display contents, and then, returns the flow to step S412, and repeatedly performs the similar processings (step S414). Thereby, the controller 20 changes the tentatively-determined display contents that are the tentative display contents to achieve the shorter preparation time Tp than the control cycle Tc. To the contrary, if the preparation time Tp is shorter than the control cycle Tc (step S413: Yes), the controller 20 determines the tentatively-determined display contents that are the current tentative display contents as the final display contents (step S415).

<Method of Predicting Preparation Time>

FIG. 17A is a diagram illustrating a specific example of a method of predicting the preparation time (step S412) of FIG. 16. FIG. 17B is a diagram illustrating a specific example different from that of FIG. 17A. As illustrated in FIGS. 17A and 17B, the controller 20 previously stores the predicted time information 400 for defining the relationship between the difference in the display contents and the predicted time required for preparing the video data. Specifically, the predicted time information 400 includes a basic time that is 0.8 [msec] in this example and a coefficient of each item included in the display format of each video illustrated in FIG. 14.

That is, the predicted time information 400 includes a size coefficient C1, a display position coefficient C2, and a design type coefficient C3. The design type coefficient C3 includes a polygon count coefficient C31 and a gradation coefficient C32. The size coefficient C1 is a coefficient proportional to the size of the video VD. The size coefficient C1 is fixedly defined for each type of the video VD such as the video VDa1 indicating the alert, the video VDb indicating the traveling direction, and the video VDc indicating the navigation information illustrated in FIG. 13A.

The display position coefficient C2 is defined such that the nearer the display position of the video VD is, the larger the display position coefficient C2 is. In this example, the display position is classified into three levels that are near, middle, and far display positions. The display position coefficient C2 is defined to 1.5 in the case of the near display position, to 1.0 in the case of the middle display position, and to 0.5 in the case of the far display position. The polygon count coefficient C31 is defined such that the higher the polygon count in drawing the video VD is, the larger the polygon count coefficient C31 is. In this example, the polygon count is classified into two levels that are a polygon count equal to or higher than a reference value and a polygon count lower than reference value, in other words, that are a high polygon count and a standard polygon count, and the polygon count coefficient C31 is defined to 1.2 in the case of the high polygon count, and to 1.0 in the case of the standard polygon count.

The gradation coefficient C32 depends on a case with/ without gradation. In this example, the gradation coefficient C32 is defined to 1.1 in the case with gradation, and to 1.0 in the case without gradation. Note that the basic time and the values of the respective coefficients are defined in consideration of all of the time required for the video data creating processing that is the drawing processing in step S42A of FIG. 15, the time required for the writing down to the frame buffer 18 in step S123A, and the time required for the distortion correction in step S124A. As a specific defining method, for example, a method based on simulations, a method based on actual measurement values, and the like are exemplified.

The controller 20 predicts the preparation time Tp by multiplying the basic time by each coefficient with reference to the predicted time information 400. Specifically, the controller 20 calculates a predicted time Tr required for preparing the video data for each video VD from "basic time×C1×C2×C31×C32." Note that a method of calculating the predicted time Tr is not limited to the above method, and the predicted time Tr may be calculated from "basic time× C1×C2×C31" in some cases. Further, if there is another parameter affecting the predicted time Tr, the predicted time Tr may be calculated in consideration of this parameter.

Furthermore, the predicted time Tr is not calculated every time from the basic time and the coefficients. For example, information indicating how long it takes for the preparation depending on which video, which size, which position, and which design is to be displayed may be previously stored as the predicted time information. Although this case needs to store the time required for the preparation for each video VD, it is unnecessary to calculate the predicted time Tr every time. The controller 20 predicts the preparation time Tp by summing the predicted time Tr of the respective videos VD calculated by the above method.

As a specific example, it is assumed that the display contents are tentatively determined in step S411 of FIG. 16 to display three videos VD1 to VD3 as illustrated in FIG. 17A. The video VD1 is displayed with the size coefficient C1 of 5 at the near display position and with 3D graphics and gradation. The video VD2 is displayed with the size coefficient C1 of 2 at the middle display position and with 2D graphics. The video VD3 is displayed with the size coefficient C1 of 10 at the far display position and with 2D graphics and gradation.

In this case, the controller 20 calculates the predicted time Tr required for preparing the video data of the video VD1 as "7.9 [mesc]=0.8×C1 (=5)×C2 (=1.5)×C31 (=1.2)×C32 (=1.1)". Similarly, the controller 20 calculates the predicted time Tr required for preparing the video data of the video VD2 as 1.6 [msec], and calculates the predicted time Tr required for preparing the video data of the video VD3 as 4.4 [msec].

Then, the controller 20 predicts the preparation time Tp as "13.9 [msec]=7.9+1.6+4.4" by summing the calculated predicted time Tr of the respective videos VD1 to VD3. If the control cycle Tc is, for example, 16.6 ms, the predicted preparation time Tp is shorter than the control cycle Tc. Thus, in step S415 of FIG. 16, the controller 20 determines the display contents to be the three videos VD1 to VD3 with the original display formats.

Further, as another specific example, as illustrated in FIG. 17B, it is assumed that the display contents are tentatively determined to display two videos VD4 and VD5 in addition to the three videos VD1 to VD3 of FIG. 17A. The video VD4 is displayed with the size coefficient C1 of 8 at the middle display position and with 2D graphics. The video VD5 is displayed with the size coefficient C1 of 2 at the near display position and with 3D graphics.

In this case, the controller 20 calculates the predicted time Tr required for preparing the video data of the video VD4 as "6.4 [msec]=0.8×C1 (=8)×C2 (=1.0)×C31 (=1.0)×C32 (=1.0)". Similarly, the controller 20 calculates the predicted time Tr required for preparing the video data of the video VD5 as 2.9 [msec]. Then, the controller 20 predicts the preparation time Tp as 23.2 [msec] by summing the calculated predicted time Tr of the respective videos VD1 to VD5. The predicted preparation time Tp is longer than the control cycle Tc. Thus, in step S414 of FIG. 16, the controller 20 changes the display contents that are the tentatively-determined display contents.

<Method of Changing Display Contents>

FIG. 18 is a diagram for explaining an exemplary method of changing the display contents (step S414) of FIG. 16. The controller 20 changes the number of videos VD or changes the display format of each video VD, in other words, changes at least one of size, display position, and design type, to achieve the shorter preparation time Tp than the control cycle Tc. At this time, as illustrated in FIG. 18, for example, the controller 20 previously causes the memory 17 or the like to store priority information 410 for defining the priorities of the items to be changed. Then, the controller 20 changes the display contents while increasing the items to be changed on the basis of the priority information 410 until the shorter preparation time Tp than the control cycle Tc is achieved.

In the priority information 410 of FIG. 18, the number of videos VD is set to have a lower priority than that of the display format of each video VD. In the example of FIG. 18, in changing the display format of each video VD, the respective priorities of the design type, the size, the display position, and the distortion correction are in descending order. The controller 20 first changes the design type of each video VD on the basis of the priority information 410. Specifically, for example, the controller 20 changes 3D graphics to 2D graphics, and changes the case with gradation to the case without gradation.

Thereby, in FIG. 16, if the preparation time Tp predicted again is shorter than the control cycle Tc (steps S412 and S413), the controller 20 determines the display contents by use of the changed videos VD (step S415). To the contrary, if the preparation time Tp predicted again is still longer than the control cycle Tc (steps S412 and S413), the controller 20 changes the size of each video VD to be small in addition to the design type of each video VD. Specifically, for example, the controller 20 previously defines a lower size limit for each video VD, and gradually reduces the size of each video VD down to the lower limit.

As a specific example, in FIG. 17B, it is assumed that the lower size limit of the video VD3, specifically the lower limit of the size coefficient C1 is set to 8. In this case, the controller 20 first changes the size of the video VD3 to a size with a size coefficient C1 of 9. Then, if "Tp>Tc" still remains, the controller 20 further changes the size to a size with a size coefficient C1 of 8. At this time, however, a video VD which is not permitted to be changed in the size coefficient C1, in other words, for which the lower limit is not set, can be set depending on the type of the video VD.

Subsequently, the controller 20 similarly adds the display position and the distortion correction to the items to be changed, on the basis of the priority information 410 until "Tp<Tc" is met. In changing the display position, the controller 20 reduces the size by moving the display position toward the background. At this time, a video VD which is not permitted to be changed in the display position can be set depending on the type of the video VD. Further, in changing the item of the distortion correction, for example, the controller 20 applies predetermined simplified distortion correction, or does not perform the distortion correction itself.

If "Tp>Tc" still remains even if the display format of each video VD is changed as described above, the controller 20 finally decreases the number of videos VD. At this time, controller 20 determines from which video VD the deletion sequentially starts on the basis of, for example, the suppression table of FIG. 11C or the like. In the suppression table, as described above, the priorities are set such that the higher the contribution of the vehicle information 4 that is the type of the video VD to safe driving is, the lower the possibility of the deletion is.

Figure 19:
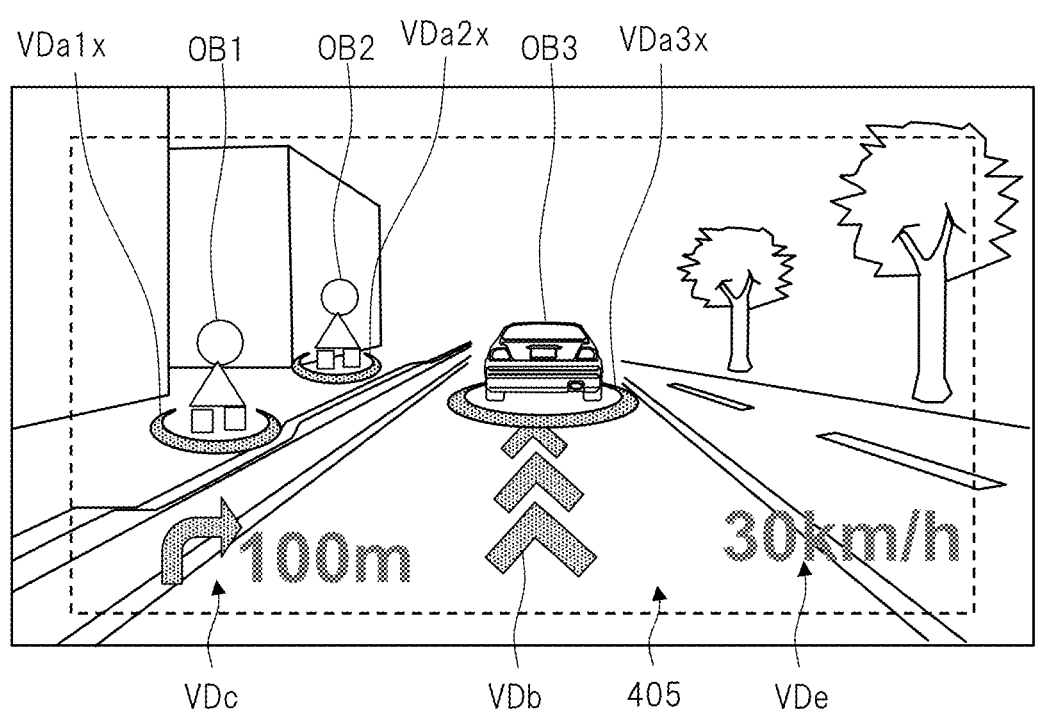
FIG. 19 is a schematic diagram illustrating an exemplary display content of an HUD apparatus acquired as a result of a change in a display content in FIG. 18.

FIG. 19 is a schematic diagram illustrating exemplary display contents of the HUD apparatus as a result of the change in the display contents in FIG. 18. An upper side of FIG. 19 illustrates the changed-yet display contents as similar to those of FIG. 11A. That is, this illustrates seven videos VDa1 to VDa3 and VDb to VDe. The videos VDa1 and VDa2 are displayed to be superimposed on the objects OB1 and OB2 as persons here, respectively. The video VDa3 is displayed to be superimposed on the object OB3 as a vehicle here. The videos VDb, VDc, VDd, and VDe indicate the traveling direction, the navigation information, the road sign, and the speed information, respectively. The videos VDa1 to VDa3 are displayed with 3D graphics and gradation.

A lower side of FIG. 19 illustrates the changed display contents. The videos VDa1 to VDa3 in the changed-yet display contents are replaced with videos VDa1x to VDa3x in the changed display contents, respectively. The videos VDa1x to VDa3x are displayed with 2D graphics and without gradation. Further, the sizes of the videos VDa1x to VDa3x are slightly smaller than those of the videos VDa1 to VDa3, respectively.

Additionally, in the example of FIG. 19, since the preparation time Tp is still longer than the control cycle Tc even if the videos VDa1x to VDa3x are used, the video VDd indicating the speed information is deleted as illustrated with a reference symbol 405. That is, in this example, the video VDd indicating the speed information is deleted based on assumption that the contribution of the video VDd to safe driving is smaller than those of the other videos VD. By such a changing method, the display contents can be changed in terms of safe driving such that the changed-yet display contents are kept as many as possible while the user such as the driver does not feel very uncomfortable for the change.

Figure 20:
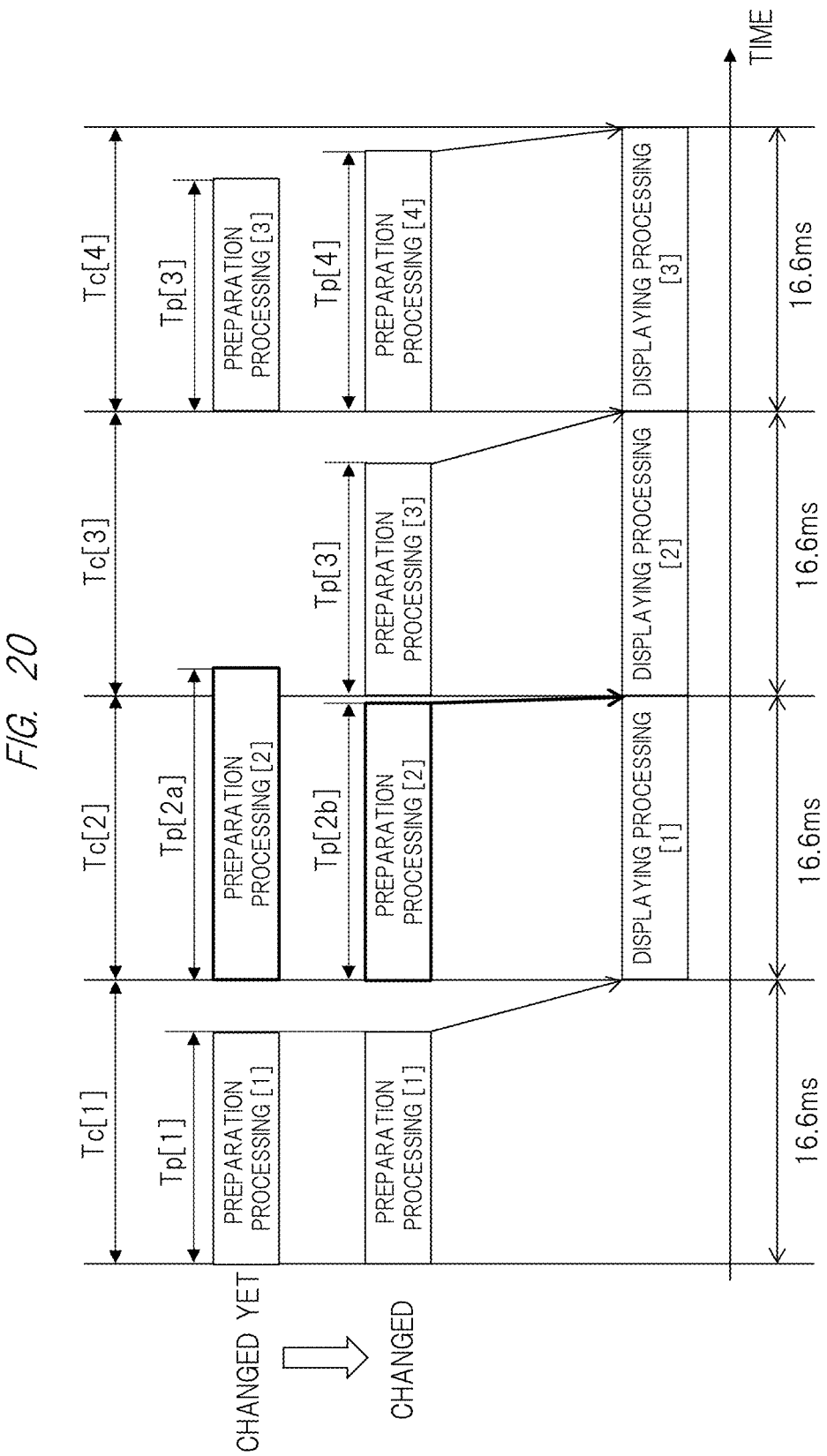
FIG. 20 is a timing chart in displaying a video in the flows of FIGS. 15 and 16.

FIG. 20 is a timing chart in displaying the video in the flows of FIGS. 15 and 16. As similar to FIG. 7, FIG. 20 illustrates the operations performed in the first to fourth processing cycles that are the control cycles Tc[1] to Tc[4]. The control cycle Tc is, for example, 16.6 ms. As illustrated in FIG. 20, if the display contents are not tentatively changed, for example, the preparation time Tp[2a] in the control cycle Tc[2] may be longer than the control cycle Tc[2]. In this case, the drop frame is caused as illustrated in FIG. 7.

To the contrary, if the display contents are changed, for example, the preparation time Tp[2b] in the control cycle Tc[2] can be made shorter than the control cycle Tc[2]. Consequently, the drop frame can be prevented. Note that the preparation time Tp includes the time required for the processing of adjusting the display contents (step S41A) illustrated in FIGS. 15 and 16. Thus, the time required for step S41A is an overhead time in the preparation time Tp, but is generally much shorter than time required for steps S42, S123, and S124, and therefore, is considered as negligible.

Further, the system according to the first embodiment performs so-called feedback control to perform the control based on a result of the monitoring of the actually-caused preparation time Tp, and therefore, has a possibility of instantaneous occurrence of a situation such as the preparation time Tp[2a] of FIG. 20. To the contrary, the system according to the second embodiment performs so-called feedforward control to perform the control while predicting the preparation time Tp, and therefore, ideally does not cause the situation such as the preparation time Tp[2a] of FIG. 20.

Principal Effects of Second Embodiment

As described above, effects similar to the effects of the first embodiment can be obtained also by the system according to the second embodiment. That is, the drop frame or the like can be suppressed or prevented, thereby securing the minimal display quality. Further, the required display specification can be met as much as possible within the range of hardware processing performance, and various display specifications can be flexibly supported. Furthermore, since the preparation time Tp is predicted, it is more difficult to excessively change or suppress the change of the display contents than the system according to the first embodiment, thereby further enhancing the display quality.

Note that the system according to the first embodiment is particularly effective when, for example, the display specification has a large number of variable factors as seen in initial products and the like, thereby causing the difficulty in the creation of the predicted time information 400 as illustrated in FIGS. 17A and 17B. To the contrary, the system according to the second embodiment is particularly effective when, for example, the display specification has a small number of variable factors as seen in products matured to some extent and the like. Further, the predicted time information 400 is to be created in the system according to the second embodiment, and thus, the system according to the first embodiment is more effective in terms of flexibility or versatility for the display specification having the large number of variations.

Third Embodiment

<Details of Controller>

Figure 21A:
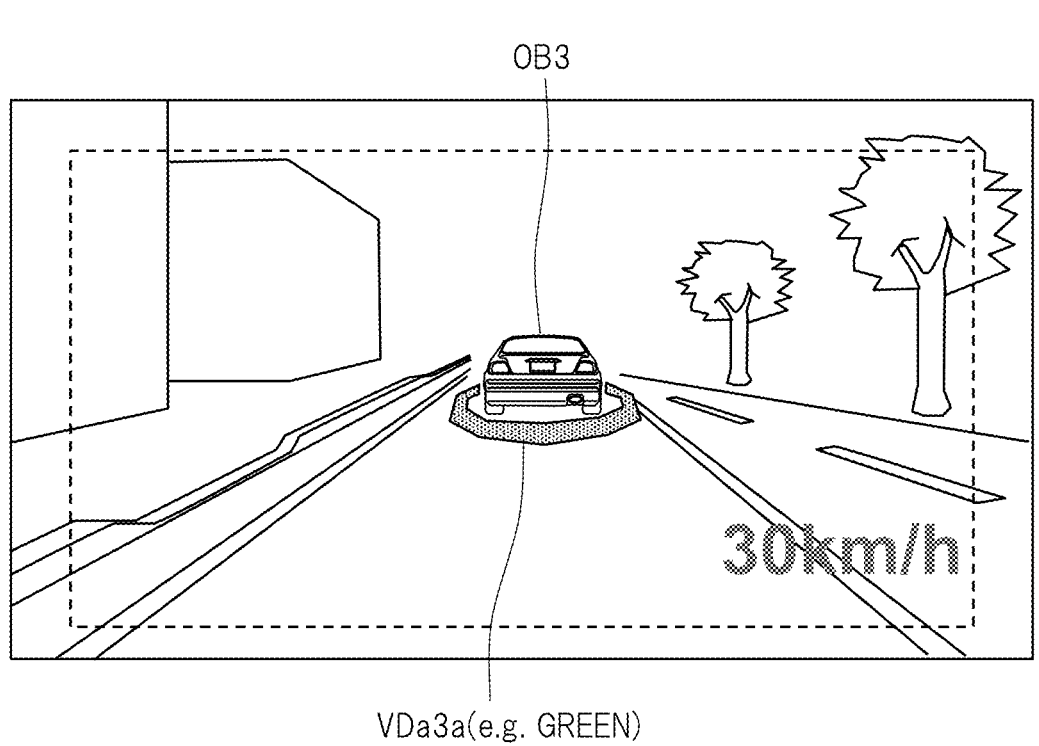
FIG. 21A is a schematic diagram illustrating an exemplary principal processing content of a controller in an HDU apparatus according to a third embodiment.
Figure 21B:
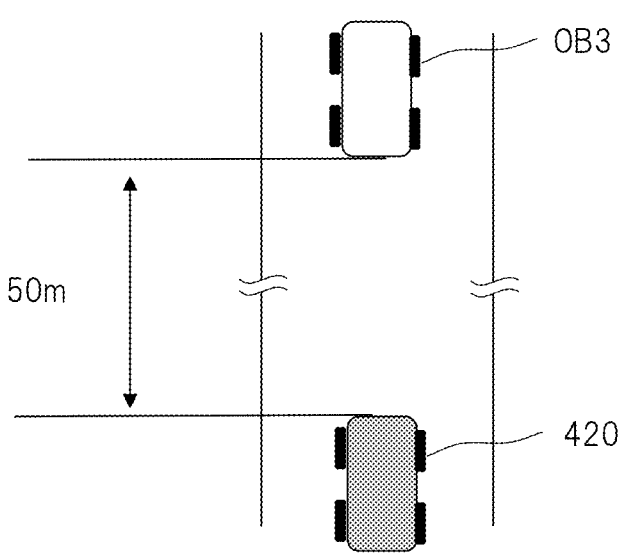
FIG. 21B is a diagram supplementary to FIG. 21A.
Figure 22A:
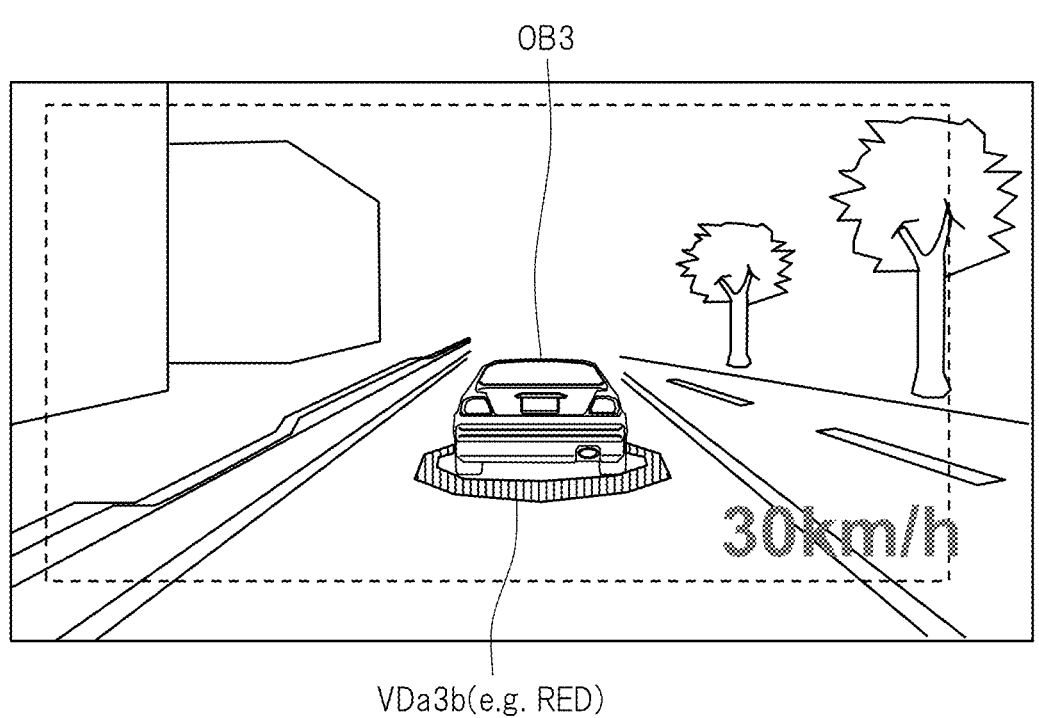
FIG. 22A is a schematic diagram illustrating an example different from FIG. 21A.
Figure 22B:
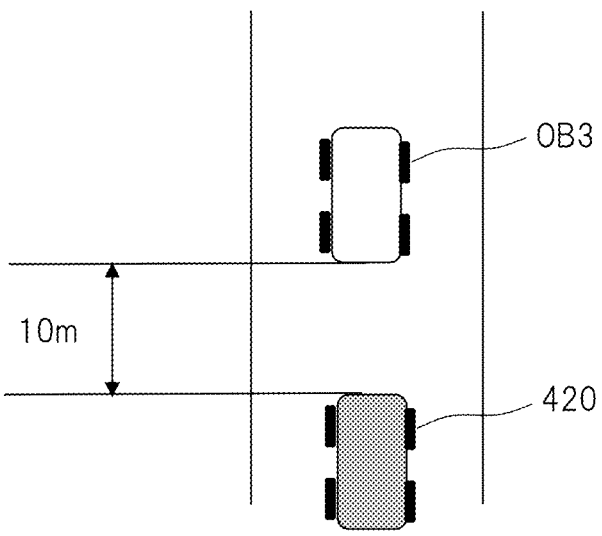
FIG. 22B is a diagram supplementary to FIG. 22A.

FIG. 21A is a schematic diagram illustrating exemplary principal processing contents of the controller in an HUD apparatus according to a third embodiment, and FIG. 21B is a diagram supplementary to FIG. 21A. FIG. 22A is a schematic diagram illustrating an example different from FIG. 21A, and FIG. 22B is a diagram supplementary to FIG. 22A. The HUD apparatus 1 according to the third embodiment achieved by the is configuration of FIG. 3A or FIG. 3B. The controller 20 superimposes the alert video on the object OB3 as the vehicle here, as illustrated with a video VDa3a of FIG. 21A and a video VDa3b of FIG. 22A.

At this time, the controller 20 determines the colors or shapes of the videos VDa3a and VDa3b as the alert videos, depending on a distance to the object OB3. In the example of FIGS. 21A and 21B, the distance between a user's vehicle 420 mounting the HUD apparatus 1 and the object OB3 ahead of the vehicle 420 is 50 m. In this case, the controller 20 determines the color of the video VDa3a as, for example, green. To the contrary, in the example of FIGS. 22A and 22B, the distance between the user's vehicle 420 and the object OB3 is 10 m. In this case, the controller 20 determines the color of the video VDa3b as, for example, red.

FIG. 23 is a diagram illustrating an exemplary configuration of a display setting table stored in the controller in the HUD apparatus according to the third embodiment. The controller 20 causes the memory 17 or the like to previously store, for example, a display setting table 415 as illustrated in FIG. 23. The display setting table 415 a defines correspondence between the distance to the object OB3 ahead of it and the color or shape of the alert video, that is the color in this example. In this example, the color of the alert video is red when the distance to the object OB3 is smaller than 12 m, green when the distance is equal to or larger than 32 m, and yellow when the distance is in a range between 17 m and 27 m. Further, colors in a range between 12 m and 17 m and in a range between 27 m and 32 m are defined to neutral colors, respectively, as needed.

The display setting table 415 is set such that, for example, the smaller the distance to the object OB3 is, the more attractive for the driver the color or shape is. Thereby, the display setting table can be defined to contribute to safe driving. However, recognition on the color or shape depends on a user's subjective view. Thus, the color or shape in the display setting table 415 may be optionally selected from a plurality of options by the user's initial setting. Further, the ranges of the distance in the display setting table 415 may be optionally set.

Figure 24A:
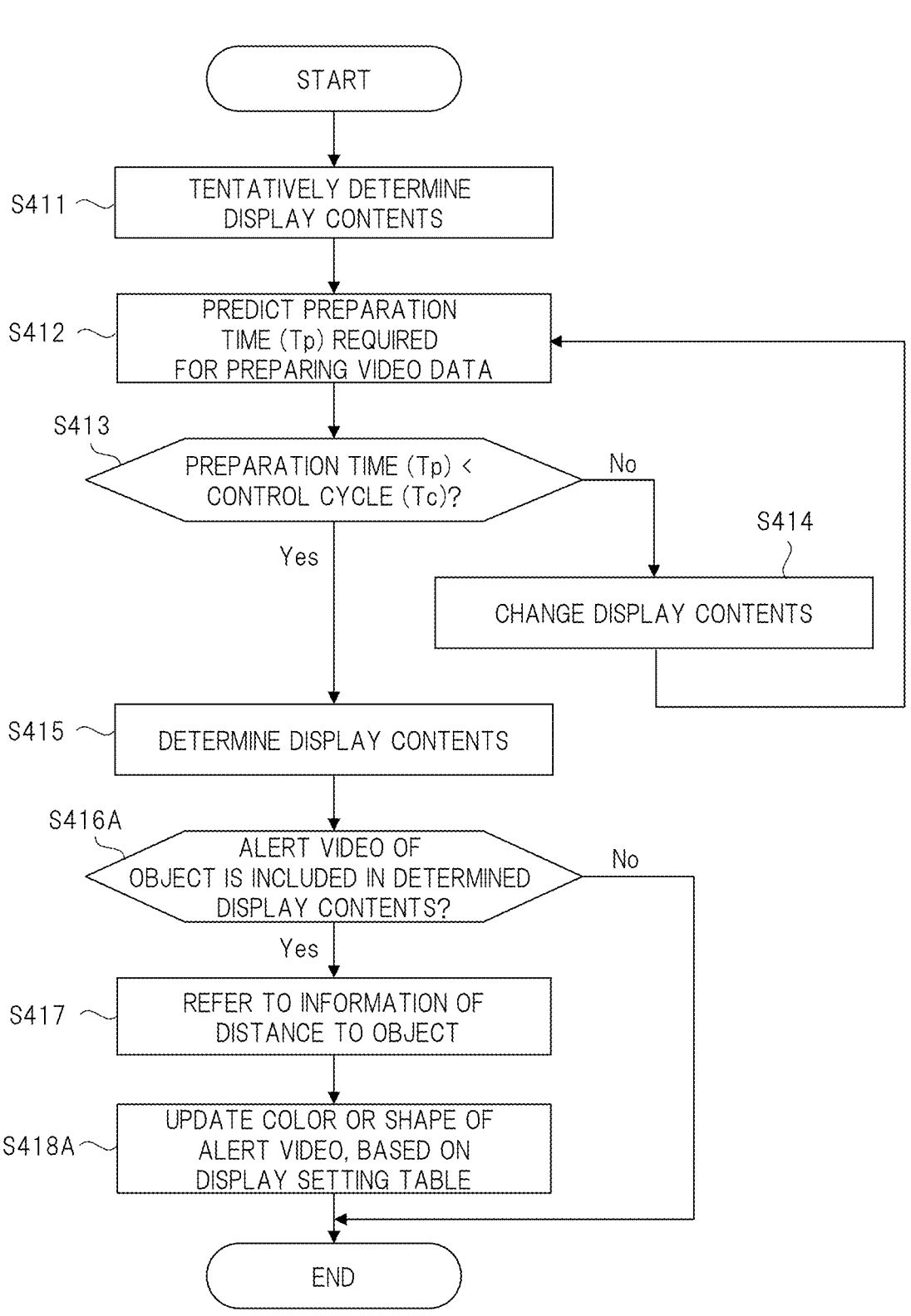
FIG. 24A is a flowchart illustrating an exemplary processing content of the controller in the HUD apparatus according to the third embodiment.

FIG. 24A is a flowchart illustrating exemplary processing contents of the controller in the HUD apparatus according to the third embodiment. In FIG. 24A, the controller 20 performs the processings in steps S411 to S415 of FIG. 16 according to the second embodiment. Further, prior to the processings, in step S11 of FIG. 15, the communication portion 16 as the information acquiring portion acquires the distance between the user's vehicle 420 and the object OB3 present ahead of the user's vehicle 420 as one item of the transportation information.

In the processings in steps S411 to S415 of FIG. 24A, the controller 20 determines the display contents such that the preparation time Tp is shorter than the control cycle Tc that is the processing cycle. Then, the controller 20 determines whether the display contents determined in step S415 include the alert video to be superimposed on the object OB3 (step S416A). If the determined display contents include the alert video (step S416A: Yes), the controller 20 refers to the information on the distance to the object OB3 acquired by the communication portion 16 (step S417), and updates the color or shape of the alert video on the basis of the display setting table 415 (step S418A). If the determined display contents include a plurality of alert videos, the update processing is performed for each of the alert videos.

As described above, in the flow of FIG. 24A, if the determined display contents include the alert video, the controller 20 updates the color or shape of the alert video (step S418A) without predicting the preparation time Tp again, in other words, without performing the processings in steps S412 and the like. Thus, even after the updating of the color or shape of the alert video, it is desirable to previously define the color or shape of the alert video for each distance such that the preparation time Tp is equal to that before the update.

Figure 24B:
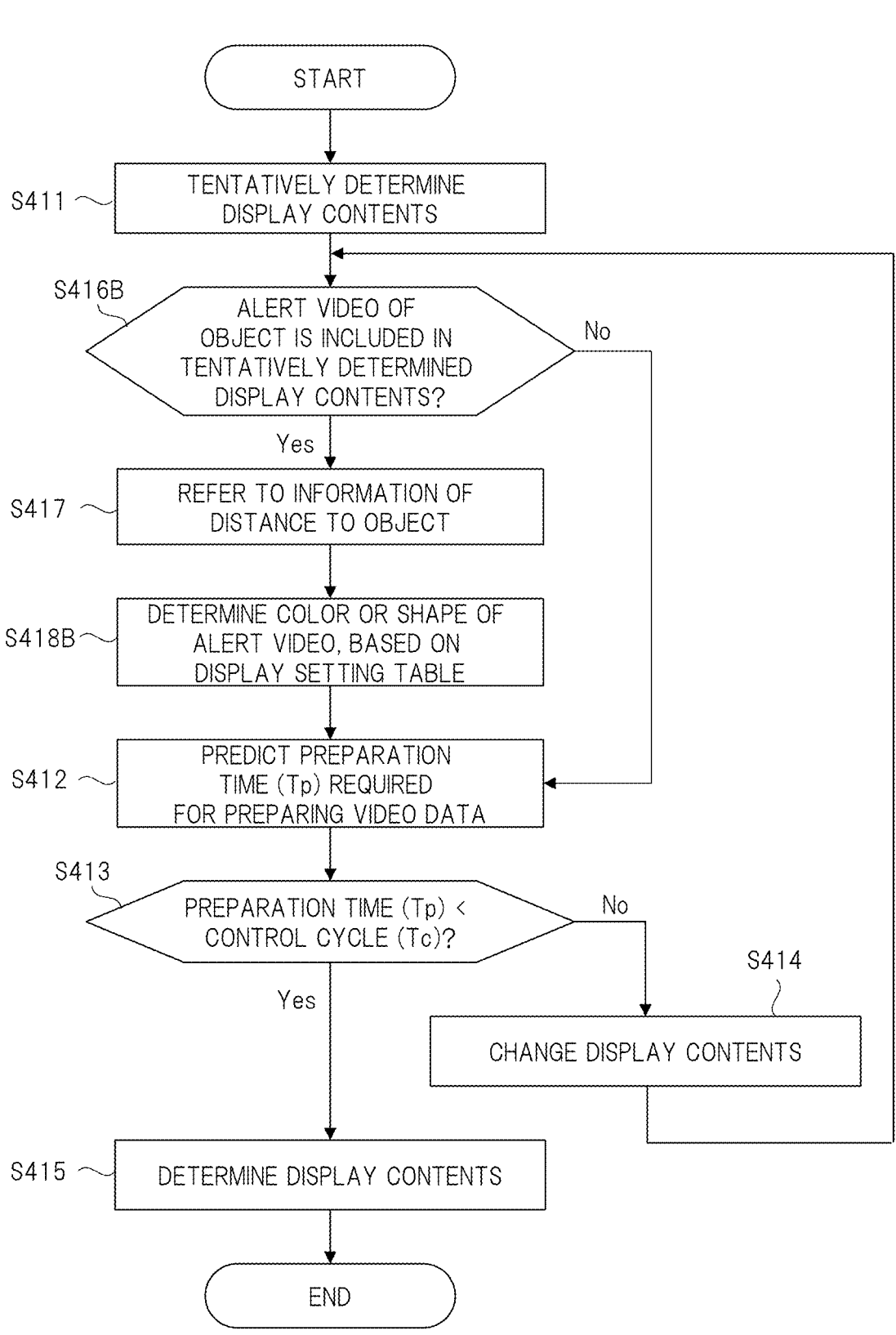
FIG. 24B is a flowchart illustrating an exemplary processing content different from FIG. 24A.

FIG. 24B is a flowchart illustrating exemplary processing contents different from those of FIG. 24A. As different from the flow of FIG. 24A, the flow of FIG. 24B includes processings similar to those in steps S416A, S417, and S418A of FIG. 24A not after the processings in steps S411 to S415 of FIG. 16 but in the processings in steps S411 to S415.

In FIG. 24B, the controller 20 tentatively determines the display contents (step S411), and then, determines whether the tentatively-determined display contents include the alert video to be superimposed on the object OB3 (step S416B). If the tentatively-determined display contents include the alert video (step S416B: Yes), the controller 20 refers to the information on the distance to the object OB3 (step S417), and determines the color or shape of the alert video on the basis of the display setting table 415 (step S418B).

Then, the controller 20 predicts the preparation time Tp required for preparing the video data based on the tentatively-determined display contents (step S412). If the tentatively-determined display contents do not include the alert video (step S416B: No), the controller 20 proceeds the flow to step S412. As similar to FIG. 16, after step S412, in the processings in steps S413 to S415, the controller 20 changes the tentatively-determined display contents such that the preparation time Tp is shorter than the control cycle Tc.

However, as different from FIG. 16, the controller 20 changes the tentatively-determined display contents, and then, proceeds the flow to step S416B (step S414). Thereby, even if the color or shape of the alert video is changed by the processing in step S414, the controller 20 returns the changed color or shape to the correct one in the processings in steps S417 and S418B, and then, can predict the preparation time Tp (step S412).

In the flow of FIG. 24B, the preparation time Tp can be predicted after the consideration of the changed color or shape of the alert video, and thus, prediction accuracy may be further enhanced than in the flow of FIG. 24A. However, in the flow of FIG. 24B, it is necessary to perform the processings in steps S416B, S417, and S418B every time of loop of steps S414 to S416B, and thus, the overhead of the processings may increase. Therefore, the flow of FIG. 24A is more effective in this regard.

Additionally, for example, the processings based on the display setting table 415 as described in steps S416A, S417, and S418A of FIG. 24A may be not limited to the system according to the second embodiment but be applied to the system according to the first embodiment. In this case, when determining the display contents in consideration of, for example, the internal state in step S121 of FIG. 6, the controller 20 may perform the processings as described in steps S416A, S417, and S418A in the final phase of the determination.

Principal Effects of Third Embodiment

As described above, the system according to the third embodiment can further contribute to safe driving because of the change of the color or shape of the alert video depending on the distance to the object in addition to the effects of the first embodiment and the second embodiment. The system according to each embodiment can further contribute to safe driving because the user 6 can visually recognize, as the videos beyond the windshield 3, various items of information required for traveling such as the alert information in response to the sensing of the oncoming vehicle or pedestrian in addition to the navigation information such as the destination or speed, and therefore, can visually recognize the videos securing the minimal display quality even if the display specification is changed. Thereby, the HUD apparatus 1 capable of reducing the movement of the line of sight of the user 6 and contributing to supporting the safe driving can be provided. Consequently, traffic accidents can be prevented. Further, the present invention can contribute to "the third goal: Good Health and Well-being (for all people)" of the Sustainable Development Goals (SDGs) advocated by the United Nations.

In the foregoing, the invention made by the inventors of the present application has been concretely described on the basis of the embodiments. However, it is needless to say that the present invention is not limited to the foregoing embodiments, and various modifications and alterations can be made within the scope of the present invention. For example, the above-described embodiments have been explained for supporting understanding of the present invention, and are not always limited to the one including all structures explained above. Also, a part of the structure of one embodiment can be replaced with the structure of another embodiment, and besides, the structure of another embodiment can be added to the structure of one embodiment. Further, another structure can be added to/eliminated from/replaced with a part of the structure of each embodiment.

EXPLANATION OF REFERENCE CHARACTERS

1: Head-up display (HUD) apparatus, 2: Vehicle, 4: Vehicle information, 5: Display region, 6: User, 11: Video display, 16: Communication portion (information acquiring portion), 20: Controller, 400: Predicted time information, 410: Priority information, 415: Display setting table, C1 to C3, C31, C32: Coefficient, M1: Mirror (video-light projector), ST0: Normal state, ST1: Restoration transit state, ST2: Suppression transit state, ST3: Suppression state, Tc: Control cycle, Tp: Preparation time, Tr: Predicted time, Tth1: First threshold time, Tth2: Second threshold time, TthD: Threshold duration, VD: Video

The invention claimed is:

1. A head-up display apparatus mounted on a transportation, the head-up display apparatus comprising:
   an information acquiring portion configured to acquire information on the transportation;
   a video display configured to display a video and to output video light of the displayed video;
   a video-light projector configured to project the video light output from the video display to a display region, thereby causing the projected video light to be visually recognized as a virtual image; and
   a controller configured to prepare video data based on the information on the transportation acquired by the information acquiring portion, and to cause the video display to display a video based on the prepared video data,
   wherein the controller performs control to reduce a processing load required for preparing the video data such that the video data is completely prepared within a predetermined processing cycle, and
   wherein the controller monitors a preparation time required for preparing the video data, and starts the control to reduce the processing load if the preparation time meets a predetermined condition.

2. The head-up display apparatus according to claim 1, wherein the controller starts the control to reduce the processing load if the preparation time is longer than the processing cycle.

3. The head-up display apparatus according to claim 1, wherein, with reference to a first threshold time shorter than the processing cycle, the controller starts the control to reduce the processing load if the preparation time is longer than the first threshold time in a plural number of times in a row.

4. The head-up display apparatus according to claim 1, wherein, after the start of the control to reduce the processing load, the controller increases stepwise a reduction amount of the processing load for each processing cycle within a suppression transit period.

5. The head-up display apparatus according to claim 4, wherein, after the suppression transit period, the controller decreases stepwise the reduction amount of the processing load for each processing cycle within a restoration transit period.

6. The head-up display apparatus according to claim 5, wherein, after the suppression transit period, and then, after a suppression period in which the video data is prepared at the reduced processing load, the controller performs the control within the restoration transit period.

7. The head-up display apparatus according to claim 6, Wherein, in the suppression period, with reference to a second threshold time shorter than the processing cycle and a threshold duration that is a period multiple times of the processing cycle or longer, the controller starts the control in the restoration transit period if the preparation time shorter than the second threshold time is continued for the threshold duration or longer.

8. The head-up display apparatus according to claim 4, wherein, in the suppression transit period, the controller generates the video data in order to notify a user of the suppression transit period.

9. The head-up display apparatus according to claim 1, wherein the controller reduces the processing load by reducing an amount of the video data to be prepared.

10. A head-up display apparatus mounted on a transportation, the head-up display apparatus comprising:

an information acquiring portion configured to acquire information on the transportation;

a video display configured to display a video and to output video light of the displayed video; and a video-light projector configured to project the video light output from the video display to a display region, thereby causing the projected video light to be visually recognized as a virtual image, wherein video data is prepared based on the information on the transportation acquired by the information acquiring portion, and a part of the video data to be prepared is changed if at least one condition for preparing the video data does not meet a predetermined condition in a predetermined processing cycle, and wherein a control to change the part of the video data to be prepared is started if a preparation time, as one of the at least one condition for preparing the video data, does not meet the predetermined condition.

11. A head-up display apparatus mounted on a transportation, the head-up display apparatus comprising:

an information acquiring portion configured to acquire information on the transportation;

a video display configured to display a video and to output video light of the displayed video;

a video-light projector configured to project the video light output from the video display to a display region, thereby causing the projected video light to be visually recognized as a virtual image; and a controller configured to determine display contents based on the information on the transportation acquired by the information acquiring portion, to prepare video data based on the determined display contents, and to cause the video display to display a video based on the prepared video data, wherein, if a preparation time required for preparing the video data of tentatively-determined display contents before determining the display contents is longer than a predetermined processing cycle, the controller changes the tentatively-determined display contents, and wherein, before determining the display contents, the controller predicts the preparation time required for preparing the video data based on the tentatively-determined display contents, predicted based on predicted time information for defining a relationship between the display contents and a predicted time required for preparing the video data, and changes the tentatively-determined display contents such that the preparation time is shorter than the processing cycle if the preparation time is longer than the processing cycle.

12. The head-up display apparatus according to claim 11, wherein items in changing the tentatively-determined display contents include the number of videos or a display format of each video, and items in changing the display format of each video include at least one of a size, a display position, and a design type.

13. The head-up display apparatus according to claim 12, wherein the controller previously stores priority information for defining a priority of each of the items, and changes the tentatively-determined display contents while increasing the items to be changed based on the priority information until the preparation time is shorter than the processing cycle.

14. The head-up display apparatus according to claim 13, wherein the items in changing the tentatively-determined display contents include the number of videos and the display format of each video, and the number of videos in the priority information is set to have a lower priority than a priority of the display format of each video.

15. The head-up display apparatus according to claim 12, wherein the predicted time information includes a basic time and a coefficient of each of the items included in the display format of each video, and the controller predicts the preparation time by multiplying the basic time by the coefficient.

16. The head-up display apparatus according to claim 11, wherein the information acquiring portion acquires a distance between the transportation mounting the head-up display apparatus and an object present ahead of the transportation, and if an alert video is superimposed on the object, the controller determines a color or a shape of the alert video, depending on the distance to the object.

17. The head-up display apparatus according to claim 16, wherein the controller determines the display contents such that the preparation time is shorter than the processing cycle, and then, updates the color or the shape of the alert video without predicting the preparation time again if the alert video is included in the determined display contents.

* * * * *